US012134750B2

(12) United States Patent
Kieffer et al.

(10) Patent No.: US 12,134,750 B2
(45) **Date of Patent: *Nov. 5, 2024**

(54) SOLIDIFICATION PROCESS USING LOW LEVELS OF COUPLER/HYDROTROPE

(71) Applicant: ECOLAB USA INC., Saint Paul, MN (US)

(72) Inventors: Janel Marie Kieffer, Saint Paul, MN (US); Katherine Molinaro, Saint Paul, MN (US); Gary Becker, Saint Paul, MN (US); Tobias Foster, Cologne (DE); Karina Labusga, Saint Paul (DE)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,982

(22) Filed: Aug. 16, 2023

(65) Prior Publication Data

US 2024/0043774 A1 Feb. 8, 2024

Related U.S. Application Data

(63) Continuation of application No. 17/303,814, filed on Jun. 8, 2021, now Pat. No. 11,773,348, which is a (Continued)

(51) Int. Cl.
*C11D 3/32* (2006.01)
*C11D 1/825* (2006.01)

(Continued)

(52) U.S. Cl.
CPC ............ *C11D 3/323* (2013.01); *C11D 1/8255* (2013.01); *C11D 3/046* (2013.01); *C11D 3/3409* (2013.01);

(Continued)

(58) Field of Classification Search
CPC ..... C11D 3/323; C11D 3/3418; C11D 1/8255; C11D 17/0074
See application file for complete search history.

(56) References Cited

U.S. PATENT DOCUMENTS

| | | | | |
|---|---|---|---|---|
| 4,933,102 A * | 6/1990 | Olson | ...................... | C11D 3/08 252/186.37 |
| 5,358,653 A | 10/1994 | Gladfelter et al. | | |

(Continued)

FOREIGN PATENT DOCUMENTS

| | | |
|---|---|---|
| CN | 1871334 A | 11/2006 |
| CN | 104508105 A | 4/2015 |

(Continued)

OTHER PUBLICATIONS

Ecolab USA Inc., PCT/US2017/027538 filed Apr. 14, 2017, "Written Opinion of the International Searching Authority", mailed Jul. 18, 2017.

(Continued)

*Primary Examiner* — Nicole M. Buie-Hatcher
*Assistant Examiner* — M. Reza Asdjodi
(74) *Attorney, Agent, or Firm* — McKee, Voorhees & Sease, PLC

(57) ABSTRACT

The invention includes a solid rinse aid that is particularly designed for extrusion solid formation and which is effective for creating spotless surfaces after rinsing. According to the invention, application has identified the critical combination of solid surfactants, coupling agents, hydrotrope, and hardening agents that is acceptable in the extrusion process to create a solid. The hydrotrope includes one or more short-chain alkylbenzene and/or alkyl naphthalene sulfonates. The composition hardens quickly but not so quick as to negatively impact the extrusion process. The compositions may also be used to form pressed or cast solids.

20 Claims, 3 Drawing Sheets

Related U.S. Application Data continuation of application No. 16/946,959, filed on Jul. 13, 2020, now Pat. No. 11,060,048, which is a continuation of application No. 16/243,896, filed on Jan. 9, 2019, now Pat. No. 10,745,650, which is a continuation of application No. 15/131,343, filed on Apr. 18, 2016, now Pat. No. 10,221,376.

(51) Int. Cl.

| | |
|---|---|
| ***C11D 3/04*** | (2006.01) |
| ***C11D 3/34*** | (2006.01) |
| ***C11D 17/00*** | (2006.01) |

(52) U.S. Cl.

CPC ........ *C11D 3/3418* (2013.01); *C11D 17/0047* (2013.01)

(56) References Cited

U.S. PATENT DOCUMENTS

| | | | | |
|---|---|---|---|---|
| 5,876,514 | A * | 3/1999 | Rolando | C11D 1/72 134/40 |
| 6,258,765 | B1 * | 7/2001 | Wei | C11D 3/06 510/451 |
| 6,432,906 | B1 | 8/2002 | Carlson et al. | |
| 6,630,440 | B1 | 10/2003 | Song et al. | |
| 6,645,924 | B2 * | 11/2003 | Klos | B08B 3/02 222/64 |
| 6,968,594 | B2 * | 11/2005 | Cheatham | A47L 11/4061 15/340.2 |
| 7,279,455 | B2 * | 10/2007 | Kieffer | C11D 3/0026 134/40 |
| 10,221,376 | B2 * | 3/2019 | Kieffer | C11D 3/3409 |
| 10,421,926 | B2 * | 9/2019 | Man | C11D 3/0026 |
| 11,155,769 | B2 * | 10/2021 | Ellingson | C11D 3/042 |
| 2002/0147124 | A1 * | 10/2002 | Klos | B01F 21/22 510/447 |
| 2002/0168216 | A1 * | 11/2002 | Policicchio | A47L 13/20 401/138 |
| 2003/0195134 | A1 | 10/2003 | Vandijk et al. | |
| 2005/0101516 | A1 * | 5/2005 | Kieffer | C11D 3/3707 510/514 |
| 2008/0293615 | A1 * | 11/2008 | Kieffer | C11D 1/825 510/514 |
| 2009/0203569 | A1 | 8/2009 | Kieffer et al. | |
| 2009/0305940 | A1 * | 12/2009 | Schimmel | C11D 1/722 510/421 |
| 2010/0212927 | A1 * | 8/2010 | Harrick | G01V 1/38 174/110 R |
| 2010/0292127 | A1 * | 11/2010 | Kieffer | C11D 1/825 510/514 |
| 2012/0245074 | A1 * | 9/2012 | Kieffer | C11D 3/3707 510/513 |
| 2013/0345111 | A1 * | 12/2013 | Kieffer | C11D 3/3418 510/513 |
| 2013/0345112 | A1 | 12/2013 | Sun et al. | |
| 2017/0051234 | A1 * | 2/2017 | Foster | C11D 3/2075 |
| 2017/0298298 | A1 * | 10/2017 | Kieffer | C11D 1/8255 |
| 2018/0208876 | A1 | 7/2018 | Man et al. | |
| 2019/0144786 | A1 * | 5/2019 | Kieffer | C11D 1/8255 510/514 |
| 2020/0032164 | A1 | 1/2020 | Ellingson et al. | |
| 2020/0362267 | A1 * | 11/2020 | Kieffer | C11D 3/323 |
| 2022/0010237 | A1 * | 1/2022 | Ellingson | C11D 3/2072 |
| 2024/0043774 | A1 * | 2/2024 | Kieffer | C11D 3/3409 |

FOREIGN PATENT DOCUMENTS

| | | | |
|---|---|---|---|
| EP | 2392639 | A1 | 12/2011 |
| JP | 2008545841 | A | 12/2008 |
| JP | 2010528148 | A | 8/2010 |
| JP | 2011511879 | A | 4/2011 |
| JP | 2012520910 | A | 9/2012 |
| JP | 2012526890 | A | 11/2012 |
| JP | 2015521669 | A | 7/2015 |
| WO | 9919451 | A1 | 4/1999 |
| WO | 2011112674 | A2 | 9/2011 |
| WO | 2016033563 | A1 | 3/2016 |

OTHER PUBLICATIONS

BASF, "Plurafac SLF-18B45 Low-Foaming Alcohol Alkoxylate", Technical Bulletin, (2002), 3 pages. Jan. 1, 2002.

Korean Patent Office, "The International Search Report and the Written Opinion of the International Searching Authority, or the Declaration", issued in connection to PCT/US2013/059013, mailed Nov. 20, 2013, 13 pages. Nov. 20, 2013.

Korean Patent Office, "The International Search Report and the Written Opinion of the International Searching Authority, or the Declaration", issued in connection to PCT/US2013/046589, mailed Sep. 24, 2013, 12 pages. Sep. 24, 2013.

* cited by examiner

SOLIDIFICATION PROCESS USING LOW LEVELS OF COUPLER/HYDROTROPE

CROSS REFERENCE TO RELATED APPLICATION

This is a Continuation application of U.S. Ser. No. 16/946,959, filed Jul. 13, 2020, which is a continuation application of U.S. Ser. No. 16/243,896, filed Jan. 9, 2019, now U.S. Pat. No. 10,745,650, issued Aug. 18, 2020, which is a continuation application of U.S. Ser. No. 15/131,343, filed Apr. 18, 2016, now U.S. Pat. No. 10,221,376, issued Mar. 5, 2019, all of which are herein incorporated by reference in their entirety.

FIELD OF INVENTION

The present invention relates to solid rinse aid compositions, and methods for manufacturing and using the same. The rinse aid compositions generally include a novel solidification system and surfactants designed primarily for use in extruded solid formation. The rinse aids can be utilized in warewash situations as aqueous use solutions for rinsing articles including, for example, cookware, dishware, flatware, glasses, cups, hard surfaces, healthcare surfaces, glass surfaces, vehicle surfaces, etc. but are particularly useful for plastic.

BACKGROUND OF THE INVENTION

Mechanical warewashing machines have been common in the institutional and household environments for many years. Such automatic warewashing machines clean dishes using two or more cycles which can include initially a wash cycle followed by a rinse cycle, but may also utilize soak, pre-wash, scrape, sanitizing, drying, and additional wash cycles. Rinse agents are conventionally used in warewashing applications to promote drying and to prevent the formation of spots.

Rinse agents may also be used in healthcare environments, typically for cleaning a medical cart, cage, instrument, or device. Typically, cleaning a medical cart, cage, instrument, or device includes contacting the medical cart, cage, instrument, or device with an aqueous cleaning composition and, rinsing or contacting the same with a rinse solution comprising a dissolved rinse aid. The method can also involve antimicrobial treatment of the medical cart, cage, instrument, or device by contacting with an aqueous antimicrobial composition formed by dissolving or suspending a solid antimicrobial composition, preferably a solid quaternary ammonium or solid halogen antimicrobial composition.

In either household, institutional, or healthcare environments, rinse agents to reduce the formation of spotting have been, commonly been added to water to form an aqueous rinse that is sprayed on the hard surfaces after cleaning is complete. The precise mechanism through which rinse agents work is not established. One theory holds that the surfactant in the rinse agent is absorbed on the surface at temperatures at or above its cloud point, and thereby reduces the solid-liquid interfacial energy and contact angle. This leads to the formation of a continuous sheet which drains evenly from the surface and minimizes the formation of spots. Generally, high foaming surfactants have cloud points above the temperature of the rinse water, and, according to this theory, would not promote sheet formation, thereby resulting in spots. Moreover, high foaming materials are known to interfere with the operation of warewashing machines.

A number of rinse aids are currently known, each having certain advantages and disadvantages. There is an ongoing need for alternative rinse aid compositions, especially alternative rinse aid compositions that are environmentally friendly (e.g., biodegradable), non-corrosive to metal, can handle high total dissolved solids, can handle high water hardness and are easily manufactured as solids.

SUMMARY OF THE INVENTION

The invention includes a solid rinse aid composition that hardens quickly and is particularly suited for extrusion solid formation. The composition may also be used in cast and pressed solid formations as well. The formulation is effective as a rinse aid, leaving surfaces spotless.

According to the invention, low levels of hydrotrope/coupler and a specific combination of two or more solid nonionic surfactants are combined with a disruption agent, and a hardening agent. The coupling agent/hydrotrope is from the class of short-chain alkylbenzene and alkyl naphthalene hydrotropes, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene. The short-chain alkylbenzene and alkyl naphthalene sulfonate class of couplers act as a solidification agent as well as a surfactant and are combined with specific surfactants to create a quick hardening composition effective for extrusion and other solid formulations. According to the invention Applicants have also found that the composition may also include other rinse aid components such as chelants, dispersants, a solid acid and the like without losing the quick hardening feature.

The coupler/hydrotrope is present at about 0.1 wt % to about 30 wt %. In further embodiments, the coupler/hydrotrope is present at about 1 wt % to about 25 wt %. In a preferred embodiment the hydrotrope c/coupler is present in the composition in an amount of less than 20% wt %. This is in stark contrast to other solid rinse aids which can require up to 80% of coupler/hydrotrope.

A solid rinse agent composition of the present invention includes a surfactant package comprising two or more nonionic solid surfactants. The solid surfactants may be selected from the group of a C12-C14 fatty alcohol EO/PO surfactant such as Novel 1012-II 21, SLF-18B-45, E127, SLF180, and AT25.

TABLE 1

| Solid nonionic surfactants | |
|---|---|
| C10-12 Alcohol 21 EO | Novel 1012 II GB 21 |
| C16-18 alkyl Alcohol Ethoxylate 25 EO | Lutensol AT 25 |
| Modified fatty alcohol polyglycoether | Dehypon E127 |
| linear alcohol ethoxylate alkyl end capped | SLF-18B-45 |

The rinse aid also includes one or more association disruption agents comprising an alcohol alkoxylate. In other embodiments the association disruption agent is a fatty alcohol alkoxylate EO or EO/PO surfactant. In preferred embodiments the association disruption agent is an alcohol alkoxylate EO or EO/PO surfactant. Examples of suitable disruption agents include Plurafac LF-500 (Ethoxylated and Propoxylated Alcohols:) alkoxylated, predominatly unbranched fatty alcohols, and with higher alkene oxides alongside ethylene oxide), Plurafac LF-221(Alcohol alkoxylate: C13-C15 branched and linear, butoxylated and ethoxylated alcohols or Plurafac RA300 (fatty alcohol alkoxylate EO or EO/PO surfactant). Interestingly, the reverse EO/PO block copolymer Plurafac 25R8 does not work for the invention.

The association disruption agent is present at about 20 wt % to about 60 wt %. In still yet other embodiments, the association disruption agent is present at about 25 wt % to about 50 wt %.

In some embodiments the invention can optionally include additional nonionic surfactants. In a preferred embodiment the surfactants are defoaming nonionic surfactants. The defoaming nonionic surfactant can include a polymer compound including one or more ethylene oxide groups. In yet other embodiments, the defoaming surfactant includes a polyether compound prepared from ethylene oxide, propylene oxide, or a mixture thereof. Surprisingly, the reverse block copolymer polyoxypropylene-polyoxyethylene, Pluronic 25R8 does not harden and is not useful for the present invention. Examples of nonionic surfactants include Dehypon LS54, TDA's or TO's, or Plurafac 127, or Plurafac 25R2).

In some embodiments, the one or more defoaming nonionic surfactants is present at between about 1 wt % to about 20 wt %. In other embodiments, the defoaming surfactant is present at between about 5 wt % to about 15 wt %.

In some aspects, the present invention is related to methods for rinsing ware in a warewashing application. The methods comprise providing an aqueous rinse aid composition, the rinse aid composition comprising: a surfactant package including two or more solid nonionic surfactants, a coupler/hydrotrope, an optional nonionic defoaming agent, one or more of an association disruption agent; a hardening agent, and one or more optional additional ingredients which can include but are not limited to a carrier, a, a chelating/sequestering agent, and/or combinations thereof. The method also comprises diluting the rinse aid composition with water to form an aqueous use solution; and applying the aqueous use solution to the ware.

In some embodiments, the ware comprises plasticware. In other embodiments, the ware dries within about 30 to about 90 seconds after the aqueous solution is applied to the ware.

The rinse aid concentrate is typically provided in a solid form. This is typically prepared by the steps of combining the solid materials then adding any liquid components. The material is then pressed or extruded to form a solid. In general, it is expected that the solid concentrate will be diluted with water to provide the use solution that is then supplied to the surface of a substrate. The use solution preferably contains an effective amount of active material to provide spotless surfaces by rinse water. It should be appreciated that the term "active materials" refers to the nonaqueous portion of the use solution that functions to reduce spotting and filming.

Some example methods for using the rinse aid generally include the step of providing the rinse aid, mixing the rinse aid into an aqueous use solution, and applying the aqueous use solution to a substrate surface.

The solid rinse aid can also in some embodiments and as enumerated hereinafter, include an additional surfactant, a processing aids such as polyethylene glycol or urea, as well as other components such as a chelant, preservative, fragrant, or dye.

In some aspects, the present invention is related to methods for rinsing surfaces in a warewashing application or surfaces involved in healthcare. The methods comprise providing an aqueous rinse aid composition, diluting the rinse aid composition with water to form an aqueous use solution; and applying the aqueous use solution to the surfaces.

DETAILED DESCRIPTION OF THE INVENTION

Figure 1:
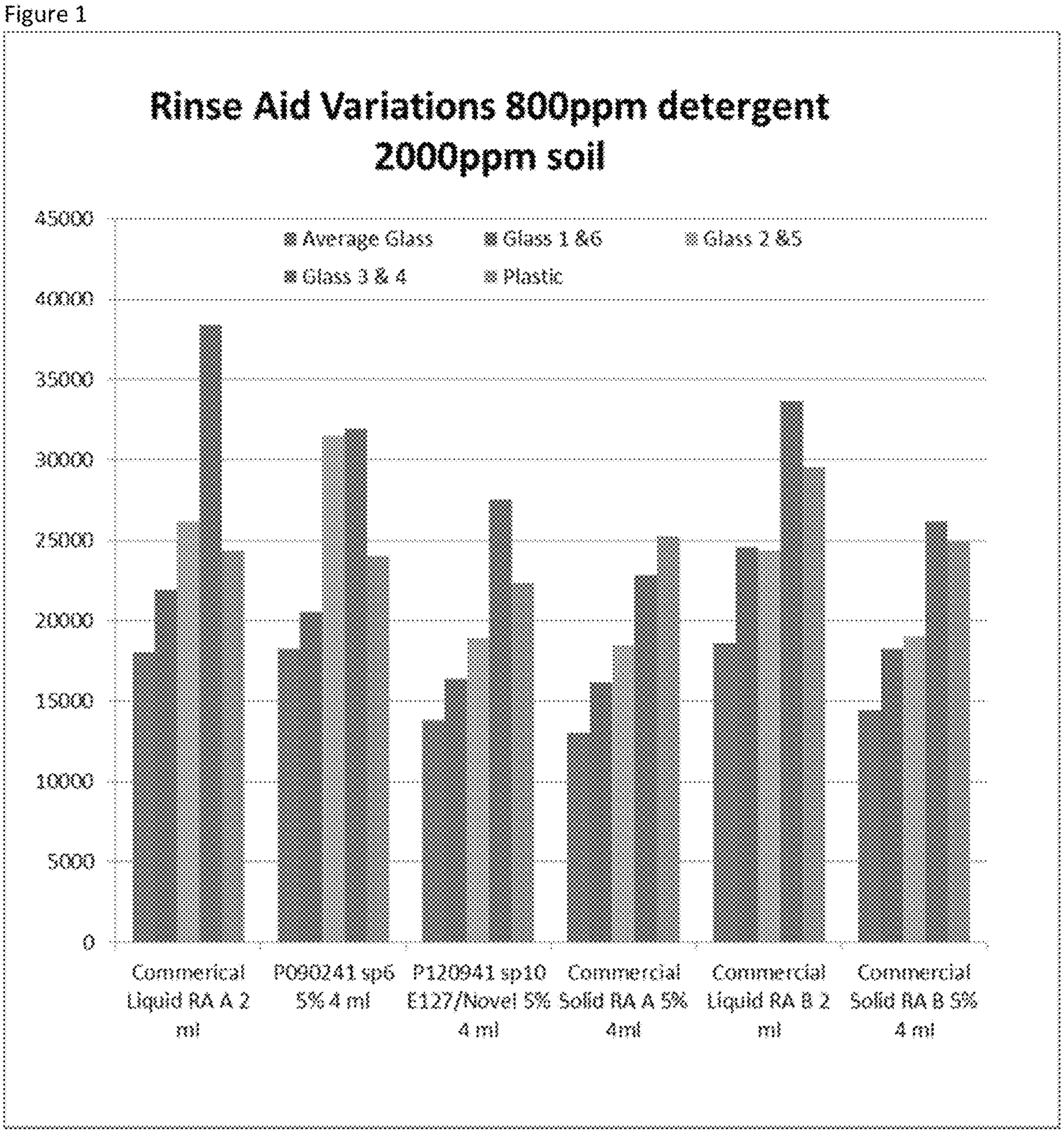
FIG. 1 is a graph showing the results from the 50 cycle tests. The graphs shows that the Commercial Liquid Rinse Aid A at 2 ml performance in this set of tests are comparable to the solid versions of P090241 set point 6 at 5% 4 ml (SLF-18B-45/Novel) while the Solid P1209041 set point 10 at 5% 4 ml (Novel/E127) and the Commercial Solid Rinse Aid A perform slightly better than the liquid version using 800 ppm of the same detergent for each test along with 2000 ppm food soil.

The present invention relates to rinse aid compositions, and methods for making and using rinse aid compositions. In some aspects, the present invention provides rinse aid compositions including low levels of hydrotrope/coupler and a specific combination oftwo or more solid nonionic surfactants, with a disruption agent, and a hardening agent. The coupler hydrotrope is generally a short-chain alkylbenzene and alkyl naphthalene sulfonate, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene. The invention can also include additional surfactant, preferably a nonionic low foaming surfactant.

The compositions of the present invention can be used to reduce spotting and filming on a variety of surfaces including, but not limited to, plasticware, cookware, dishware, flatware, glasses, cups, hard surfaces, glass surfaces, healthcare surfaces and vehicle surfaces.

So that the invention may be understood more clearly, certain terms are first defined.

As used herein, the term "ware" refers to items such as eating, cooking, and serving utensils. Exemplary items of ware include, but are not limited to: dishes, e.g., plates and bowls; silverware, e.g., forks, knives, and spoons; cups and glasses, e.g., drinking cups and glasses; serving dishes, e.g., fiberglass trays, insulated plate covers. As used herein, the term "warewashing" refers to washing, cleaning, or rinsing ware. The items of ware that can be contacted, e.g., washed, or rinsed, with the compositions of the invention can be made of any material. For example, ware includes items made of wood, metal, ceramics, glass, etc. Ware also refers to items made of plastic. Types of plastics that can be cleaned or rinsed with the compositions according to the invention include but are not limited to, those that include polycarbonate polymers (PC), acrilonitrile-butadiene-styrene polymers (ABS), and polysulfone polymers (PS). Another exemplary plastic that can be cleaned using the methods and compositions of the invention include polyethylene terephthalate (PET).

As used herein, the term "hard surface" includes showers, sinks, toilets, bathtubs, countertops, windows, mirrors, transportation vehicles, floors, and the like.

As used herein, the phrase "healthcare surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheelchairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

By the term "solid" as used with reference to the composition of the invention, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid composition can range from that of a fused solid block which is relatively dense and hard, for example, like concrete, to a consistency characterized as being malleable and sponge-like, similar to caulking material.

The "cloud point" of a surfactant rinse or sheeting agent is defined as the temperature at which a 1 wt. % aqueous solution of the surfactant turns cloudy when warmed.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the phrase "medical cart" refers to a cart employed in a health care environment to transport one or more medical instruments, devices, or equipment and that can benefit from cleaning with a use composition of a solid cleaning composition, rinsing with a use composition of a solid rinse composition, and/or antimicrobial treatment with a use composition of a solid antimicrobial composition. Medical carts include carts for transporting medical or dental devices or instruments or other medical or dental equipment in a health care environment, such as a hospital, clinic, dental or medical office, nursing home, extended care facility, or the like.

As used herein, the phrase "medical cage" refers to a cage employed in a health care environment to house and/or transport one or more animals employed in experiments, in clinical or toxicological testing, in diagnostics, or the like. Such animals include a rodent (e.g. a mouse or a rat), a rabbit, a dog, a cat, or the like. A medical cage typically includes an animal cage that actually houses the animal and which can be mounted on a wheeled rack. The medical cage can also include one or more containers or dispensers for animal food, one or more vessels or dispensers for water, and/or one or more systems for identifying the cart or animals. Medical cages can benefit from cleaning with a use composition of a solid alkaline cleaning composition, rinsing with a use composition of a solid rinse composition, and/or antimicrobial treatment with a use composition of a solid antimicrobial composition.

As used herein, the term "instrument" refers to the various medical or dental instruments or devices that can benefit from cleaning with a use composition of a solid alkaline cleaning composition, rinsing with a use composition of a solid rinse composition, and/or antimicrobial treatment with a use composition of a solid antimicrobial composition.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to:

diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like. In addition, "alkyl" may include "alylenes", "alkenylenes", or "alkylynes".

As used herein, the term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon radical having one or more carbon-double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched chain divalent hydrocarbon radical having one or more carbon-triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above.

As used herein, the term "halogen" or "halo" shall include iodine, bromine, chlorine and fluorine.

As used herein, the terms "mercapto" and "sulfhydryl" refer to the substituent —SH.

As used herein, the term "hydroxy" refers to the substituent —OH.

A used herein, the term "amino" refers to the substituent $—NH_2$.

The methods and compositions of the present invention can comprise, consist of, or consist essentially of the listed steps or ingredients. As used herein the term "consisting essentially of" shall be construed to mean including the listed ingredients or steps and such additional ingredients or steps which do not materially affect the basic and novel properties of the composition or method. In some embodiments, a composition in accordance with embodiments of the present invention that "consists essentially of" the recited ingredients does not include any additional ingredients that alter the basic and novel properties of the composition, e.g., the drying time, sheeting ability, spotting or filming properties of the composition.

As used herein, "weight percent (wt %)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Solid Rinse Aid Compositions

A solid rinse agent composition of the present invention includes a coupler/hydrotrope, of a short-chain alkylbenzene or alkyl naphthalene sulfonate, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene, and a combination of nonionic solid surfactants, with a disruption agent and a hardening agent. The invention can also include an additional nonionic surfactant preferably a low foaming surfactant. The solid rinse aid composition is advantageously formulated for extrusion processing by hardening appropriately for the extrusion solid formation process. This process is complex as hardening too quickly can jam the machine, while hardening too slowly can result in a deformed solid. The rinse aids of the invention provide a spotless surface after rinsing, especially in hard water and high total dissolved solids (TDS) situations. The rinse aid is also particularly useful for metal surfaces and avoids corrosion of the same.

Solid Nonionic Surfactants

Solid nonionic surfactants for use in the invention include those from the following table. According to the invention 2 or more of the surfactants included in the composition including Novel 1012 II 21, SLF 18B45, Lutensol AT25, and Dehypon E127. In a preferred embodiment the combinations are those below:

TABLE 2

| Solid Surfactants | |
|---|---|
| First nonionic solid surfactant | Second nonionic solid surfactant |
| SLF-18B-45 | Novel 1012 II 21 |
| Dehypon E127 | Novel 1012 II 21 |
| SLF-18B-45 | Lutensol AT-25 |
| Novel 1012 II 21 | Lutensol AT-25 |

The first and second nonionic surfactants are present in the composition in an amount of from about nonionic surfactant is present in the composition in an amount of from about 15 wt % to about 45 wt % preferably from about 20 wt % to about 40 wt % and more preferably from about 25 wt % to about 35 wt %.

Association Disruption Agent

The rinse aid composition also includes an association disruption agent. Association disruption agents suitable for use in the compositions of the present invention include surfactants that are capable of altering, e.g., interrupting, the association of the other active agents, e.g., coupling and defoaming agents, included in the rinse aids of the present invention.

In some embodiments, the association disruption agents included in the rinse aid compositions of the present invention reduce the contact angle of the rinse aid compositions. For example, in some embodiments, the association disruption agents reduce the contact angle of the rinse aid compositions by about 5°, about 10°, or by about 15°. Without wishing to be bound by any particular theory, it is thought that the lower the contact angle, the more a composition will induce sheeting. That is, compositions with lower contact angles will form droplets on a substrate with a larger surface area than compositions with higher contact angles. The increased surface area results in a faster drying time, with fewer spots formed on the substrate.

A variety of disruption association agents can be used in the rinse aid compositions of the present invention. In some embodiments, the association disruption agent includes an alcohol alkoxylate. In some embodiments, the alcohol alkoxylate includes a polyoxyethylene- polyoxypropylene copolymer surfactant (an "alcohol EO/PO surfactant"). The alcohol EO/PO surfactant can include a compact alcohol EO/PO surfactant where the EO and PO groups are in small block form, or random form. In other embodiments, the alcohol alkoxylate includes an ethylene oxide, a propylene oxide, a butylene oxide, a pentalene oxide, a hexylene oxide, a heptalene oxide, an octalene oxide, a nonalene oxide, a decylene oxide, and mixtures thereof.

In preferred embodiments the association disruption agent is a butoxy capped alcohol ethoxylate, a C12-16 Alcohol 7PO 5EO, or a Fatty Alcohol with EO PO Adducts.

Exemplary commercially available association disruption agents include, but are not limited to, Genapol EP-2454® (commercially available from Clariant), Plurafac LF-221® Plurafac LF-500® and Plurafac RA 300® (commercially available from BASF).

The association disruption agent can be present in the rinse aid compositions at between about 10 wt % to about 45 wt %. In some embodiments, the disruption association agent is present in the rinse aid composition at between about 15 wt % to about 40 wt %. In a more preferred embodiment the association disruption agent is present in an amount of from about 20 wt % to about 35 wt %.

Water/Carrier

The solid rinse aid composition can in some embodiments include water. Water many be independently added to the solid rinse aid composition or may be provided in the solid rinse aid composition as a result of its presence in a material that is added to the solid rinse aid composition. For example, materials added to the solid rinse aid composition include water or may be prepared in an aqueous premix available for reaction with the solidification agent component(s). Typically, water is introduced into the solid rinse aid composition to provide the composition with a desired viscosity prior to solidification, and to provide a desired rate of solidification.

In general, it is expected that water may be present as a processing aid and may be removed or become water of hydration. It is expected that water may be present in the solid composition. In the solid composition, it is expected that the water will be present in the solid rinse aid composition in the range of between 0 wt. % and 5 wt. %. For example, water is present in embodiments of the solid rinse aid composition in the range of between 0.01 wt. % to about 5 wt. %, or further embodiments in the range of between 0.1 wt. % and about 4 wt. %, or yet further embodiments in the range of between 0.5 wt. % and 3 wt. %. It should be additionally appreciated that the water may be provided as deionized water or as softened water.

The components used to form the solid composition can include water as hydrates or hydrated forms of the binding agent, hydrates or hydrated forms of any of the other ingredients, and/or added aqueous medium as an aid in processing. It is expected that the aqueous medium will help provide the components with a desired viscosity for processing. In addition, it is expected that the aqueous medium may help in the solidification process when is desired to form the concentrate as a solid.

In some embodiments the ratio of the carrier, association disruption agent and first solid surfactant are in a ratio of from about 1:35:15 to about 1:25:5 It is to be understood that all values and ranges between these values and ranges are encompassed by the present invention.

Coupler/Hydrotropes-Short Chain Alkyl Benzene or Alkyl Naphthalene Sulfonate

The class of short chain alkyl benzene or alkyl naphthalene sulfonates work as both a hardening agent and as a hydrotrope and total dissolved solid control active in the composition. The group includes alkyl benzene sulfonates based on toluene, xylene, and cumene, and alkyl naphthalene sulfonates. Sodium toluene sulfonate and sodium xylene sulfonate are the best known hydrotropes. These have the general formula below:

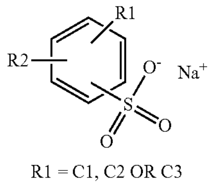

R1 = C1, C2 OR C3
R2 = C1 OR H
ALKYLBENZENE SULFONATE

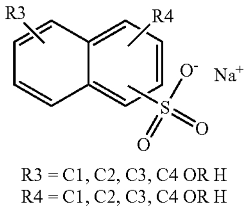

R3 = C1, C2, C3, C4 OR H
R4 = C1, C2, C3, C4 OR H
ALKYLNAPHTHALENE SULFONATE

This group includes but is not limited to sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. In a preferred embodiment the solidification agent is SXS.

The invention provides a solid rinse aid composition including effective amounts of one or more of a short chain alkyl benzene or alkyl naphthalene sulfonates. Surprisingly, this class of hydrotropes has been found to add to performance of the solid rinse aid as well as functioning as solidification agent. The short chain alkyl benzene or alkyl naphthalene sulfonate may also function as a builder. The solid rinse aid composition typically has a melt point greater than 110° F. and is dimensionally stable. The coupler/hydrotrope is present at about 0.1 wt % to about 30 wt %. In further embodiments, the coupler/hydrotrope is present at about 1 wt % to about 25 wt %. In a preferred embodiment the hydrotrope c/coupler is present in the composition in an amount of less than 20% wt %.

Hardening Agent

The solid rinse aid compositions can include a variety of solidification agents or hardening agents. In an aspect, the rinse aid composition includes an effective amount of a sulfate for solidification. Examples of suitable sulfates for use in the composition of the invention include but are not limited to sodium ethyl hexyl sulfate, sodium linear octyl sulfate, sodium lauryl sulfate, and sodium sulfate. Additional sulfates, including alkyl benzene and/or alkyl naphthalene sulfonate are disclosed above and can be formulated for efficacy as a hardening agent. In general, an effective amount of effective amount of sodium sulfate is considered an amount that acts with or without other materials to solidify the rinse aid composition.

In an aspect, the rinse aid composition includes an effective amount of urea for solidification. In general, an effective amount of urea is considered an amount that acts with or without other materials to solidify the rinse aid composition. The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, preferably about 75-100 U.S. mesh, preferably using a wet mill such as a single or twin-screw extruder, a Teledyne mixer, a Ross emulsifier, and the like. Urea hardening agents are disclosed, including ratios of urea to water or other components in an acidic composition, for example in U.S. Pat. Nos. 5,698,513 and 7,279,455, which are herein incorporated by reference in their entirety. In general, an effective amount of effective amount of urea is considered an amount that acts with or without other materials to solidify the rinse aid composition. Additional hardening agents include stearic monoethanolamide, lauric diethanolamide, an alkylamide, a solid polyethylene glycol, urea, and a solid EO/PO block copolymer.

In a preferred aspect, the hardening agent is an effective amount of a urea.

A combination of the hardening agents may further be employed.

The hardening agent if present is typically present in an amount of from about 1 wt. % to about 45 wt. %, preferably from 5 wt. % to about 40 wt. % and more preferably from about 10 wt. % to about 35 wt. %

Nonionic Defoaming Surfactant

In some aspects, the rinse aid composition can also include a defoaming surfactant. The defoaming agent is present at amount effective for reducing the stability of foam that may be created by the coupling agent in an aqueous solution. The defoaming agent can also contribute to the sheeting performance of the compositions of the present invention. Any of a broad variety of suitable defoamers may be used, for example, any of a broad variety of nonionic ethylene oxide (EO) containing surfactants. Many nonionic ethylene oxide derivative surfactants are water soluble and have cloud points below the intended use temperature of the rinse aid composition, and therefore may be useful defoaming agents.

While not wishing to be bound by theory, it is believed that suitable nonionic EO containing surfactants are hydrophilic and water soluble at relatively low temperatures, for example, temperatures below the temperatures at which the rinse aid will be used. It is theorized that the EO component forms hydrogen bonds with the water molecules, thereby solubilizing the surfactant. However, as the temperature is increased, these hydrogen bonds are weakened, and the EO containing surfactant becomes less soluble, or insoluble in water. At some point, as the temperature is increased, the cloud point is reached, at which point the surfactant precipitates out of solution, and functions as a defoamer. The surfactant can therefore act to defoam the coupling agent component when used at temperatures at or above this cloud point.

Some examples of ethylene oxide derivative surfactants that may be used as defoamers include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

$(EO)_x(PO)_y(EO)_x$ $(PO)_y(EO)_x(PO)_y$ $(PO)_y(EO)_x(PO)_y(EO)_x(PO)_y$

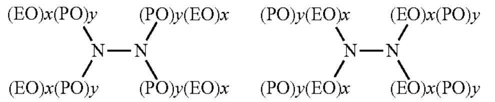

wherein EO represents an ethylene oxide group, PO represents a propylene oxide group, and x and y reflect the average molecular proportion of each alkylene oxide monomer in the overall block copolymer composition. In some embodiments, x is in the range of about 10 to about 130, y is in the range of about 15 to about 70, and x plus y is in the range of about 25 to about 200. It should be understood that each x and y in a molecule can be different. In some embodiments, the total polyoxyethylene component of the block copolymer can be in the range of at least about 20 mol-% of the block copolymer and in some embodiments, in the range of at least about 30 mol-% of the block copolymer. In some embodiments, the material can have a molecular weight greater than about 400, and in some embodiments, greater than about 500. For example, in some embodiments, the material can have a molecular weight in the range of about 500 to about 7000 or more, or in the range of about 950 to about 4000 or more, or in the range of about 1000 to about 3100 or more, or in the range of about 2100 to about 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that can be used according to the invention can be characterized heteric polyoxyethylene-polyoxypropylene block copolymers. Some examples of suitable block copolymer surfactants include commercial products such as PLURONIC® and TETRONIC® surfactants, commercially available from BASF.

The defoamer component can comprise a very broad range of weight percent of the entire composition, depending upon the desired properties. For example, for concentrated embodiments, the defoamer component can comprise in the range of 1 to about 10 wt % of the total composition, in some embodiments in the range of about 2 to about 5 wt % of the total composition, in some embodiments in the range of about 20 to about 50 wt % of the total composition, and in some embodiments in the range of about 40 to about 90 wt % of the total composition. For some diluted or use solutions, the defoamer component can comprise in the range of 5 to about 60 ppm of the total use solution, in some embodiments in the range of about 50 to about 150 ppm of the total use solution, in some embodiments in the range of about 100 to about 250 ppm of the total use solution, and in some embodiments in the range of about 200 to about 500 ppm of the use solution.

Additional Functional Materials

As indicated above, the solid rinse aid may contain other functional materials that provide the desired properties and functionality to the solid composition. Functional materials include a material that when dispersed or dissolved in a use solution, provides a beneficial property in a particular use. Examples of such a functional material include preservatives, chelating/sequestering agents; bleaching agents or activators; sanitizers/anti-microbial agents; activators; builder or fillers; anti-redeposition agents; optical brighteners; dyes; odorants or perfumes; stabilizers; processing aids; corrosion inhibitors; fillers; solidifiers; additional hardening agent; additional surfactants, solubility modifiers; pH adjusting agents; humectants; hydrotropes; or abroad variety of other functional materials, depending upon the desired characteristics and/or functionality of the composition. In the context of some embodiments disclosed herein, the functional materials, or ingredients, are optionally included within the solidification matrix for their functional properties. Some more particular examples of functional materials are discussed in more detail below, but it should be understood by those of skill in the art and others that the particular materials discussed are given by way of example only, and that a broad variety of other functional materials may be used.

Threshold Inhibitor

The solid rinse aid composition may also include effective amounts of a threshold inhibitor. The threshold inhibitor inhibits precipitation at dosages below the stoichiometric level (i.e. sub-stoichiometric) required for sequestration or chelation. Beneficially the threshold inhibitor affects the kinetics of the nucleation and crystal growth of scale-forming salts to prevent scale formation. A preferred class of threshold agents for the solid rinse aid compositions includes polyacrylic acid polymers, preferably low molecular weight acrylate polymers. Polyacrylic acid homopolymers can contain a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate, and hydroxypropyl methacrylate and a mixture thereof, among which acrylic acid. methacrylic acid, methyl acrylate, methyl methacrylate, butyl acrylate, butyl methacrylate, iso-butyl acrylate, iso-butyl methacrylate, hydroxyethyl acrylate, 2-hydroxyethyl acrylate, 2-hydroxyethyl methacrylate, 2-hydroxypropyl acrylate, and 2-hydroxypropyl methacrylate, and a mixture thereof are preferred.

Preferred are polyacrylic acids, $(C_3H_4O_2)_n$ or 2-Propenoic acid homopolymers: Acrylic acid polymer; Poly(acrylic acid); Propenoic acid polymer; PAA have the following structural formula:

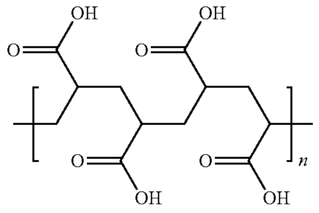

where n is any integer.

One source of commercially available polyacrylates (polyacrylic acid homopolymers) useful for the invention includes the Acusol 445 series from The Dow Chemical Company, Wilmington Delaware, USA, including, for example, Acusol® 445 (acrylic acid polymer, 48% total solids) (4500 MW), Acusol® 445N (sodium acrylate homopolymer, 45% total solids)(4500MW), and Acusol®445ND (powdered sodium acrylate homopolymer, 93% total solids)(4500MW) Other polyacrylates (polyacrylic acid homopolymers) commercially available from Dow Chemical Company suitable for the invention include, but are not limited to Acusol 929 (10,000 MW) and Acumer 1510. Yet another example of a commercially available polyacrylic acid is AQUATREAT AR-6 (100,000 MW) from AkzoNobel Strawinskylaan 2555 1077 ZZ Amsterdam Postbus 75730 1070 AS Amsterdam. Other suitable polyacrylates (polyacrylic acid homopolymers) for use in the invention include, but are not limited to those obtained from additional suppliers such as Aldrich Chemicals, Milwaukee, Wis., and ACROS Organics and Fine Chemicals, Pittsburg, Pa, BASF Corporation and SNF Inc. Additional disclosure of polyacrylates suitable for use in the solid rinse aid compositions is disclosed in U.S. Application Ser. No. 62/043,572 which is herein incorporated by reference in its entirety.

The threshold inhibitor, if present may be in an amount of from about 0.1 wt. % to about 20 wt. %, preferably from about 0.5 wt. % to about 15 wt. % and more preferably from about 1 wt. % to about 10 wt. % of the solid rinse aid composition.

Chelating/Sequestering Agents

The solid rinse aid composition may also include effective amounts of chelating/sequestering agents, also referred to as builders. In addition, the rinse aid may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a threshold agent when included in an effective amount.

Often, the solid rinse aid composition is also phosphate-free and/or amino-carboxylate-free. In embodiments of the solid rinse aid composition that are phosphate-free, the additional functional materials, including builders exclude phosphorous-containing compounds such as condensed phosphates and phosphonates.

Suitable additional builders include polycarboxylates. Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments of the solid rinse aid composition which are not aminocarboxylate-free may include added chelating/sequestering agents which are aminocarboxylates. Some examples of aminocarboxylic acids include, N-hydroxyethyliminodiacetic acid, nitrilotriacetic acid (NTA), ethylenediaminetetraacetic acid (EDTA), N-hydroxyethyl-ethylenediaminetriacetic acid (HEDTA) (in addition to the HEDTA used in the binder), diethylenetriaminepentaacetic acid (DTPA), Hydroxyethylidene-1,1,-diphosphonic acid and the like.

In embodiments of the solid rinse aid composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid rinse aid composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

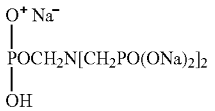

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

The chelant/sequestering agent, if present may be in an amount of from about 0.1 wt. % to about 20 wt. %, preferably from about 0.5 wt. % to about 15 wt. % and more preferably from about 1 wt. % to about 10 wt. %.

Other Nonionic Surfactants

Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants in the present invention include:

Examples of suitable nonionic surfactants include alkoxylated surfactants, such as Dehypon LS-54 and Dehypon LS-36 and capped alcohol alkoxylates, such as Plurafac LF221 and Genepol from Clariant, Tegoten EC11; mixtures thereof, or the like.))

Other nonionic surfactants that can used include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.
3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.
4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

In a preferred embodiment the nonionic surfactant is a low-foaming nonionic surfactant. Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

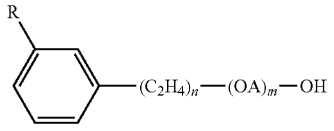

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the resiue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_3$1 hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.
9. The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.
10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.
11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The inter-saccharide bonds can be, e.g., between the one position of the additional saccharide units and the 2-, 3-, 4-, and/or 6-positions on the preceding saccharide units.
12. Fatty acid amide surfactants suitable for use in the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or $-(C_2H_4O)_xH$, where x is in the range of from 1 to 3.
13. A useful class of non-ionic surfactants includes the class defined as alkoxylated amines or, most particularly, alcohol alkoxylated/aminated/alkoxylated surfactants. These non-ionic surfactants may be at least in part represented by the general formulae:

$$R^{20}-(PO)_sN-(EO)_tH,$$

$$R_20-(PO)_sN-(EO)_tH(EO)_tH, \text{ and}$$

$$R^{20}-N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}-(PO)_v-N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes Surfonic PEA 25 Amine Alkoxylate.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Solid Acid

The invention may include one or more solid acids. The solid acid can include any acid which is naturally or treated to be in solid form at room temperature. The term solid here includes forms such as powdered, particulate, or granular solid forms. Acidic substances (herein referred to as "acids") include, but are not limited to, pharmaceutically acceptable organic or inorganic acids, hydroxyl-acids, amino acids, Lewis acids, mono- or di-alkali or ammonium salts of molecules containing two or more acid groups, and monomers or polymeric molecules containing at least one acid group. Examples of suitable acid groups include carboxylic, hydroxamic, amide, phosphates (e.g., mono-hydrogen phosphates and di-hydrogen phosphates), sulfates, and bi-sulfites.

In particular, the acids are organic acids with 2-18 carbon atoms, including, but not limited to, short, medium, or long chain fatty acids, hydroxyl acids, inorganic acids, amino acids, and mixtures thereof. Preferably, the acid is selected from the group consisting of lactic acid, gluconic acid, citric acid, tartaric acid, hydrochloric acid, phosphoric acid, nitric acid, sulfuric acid, maleic acid, monosodium citrate, disodium citrate, potassium citrate, monosodium tartrate, disodium tartrate, potassium tartrate, aspartic acid, carboxymethylcellulose, acrylic polymers, methacrylic polymers, and mixtures thereof.

For example many organic acids are crystalline solids in pure form (and at room temperature), e.g. citric acid, oxalic acid, benzoic acid. Sulphamic acid in an example of an inorganic acid that is solid a room temperature.

The solid acid or combination of one or more solid acids is present in the rinse aid compositions of the invention in an amount of from about 5 wt. % to about 40 wt. %, preferably from about 7.5 wt. % to about 27.5 wt. % and more preferably from about 10 wt. % to about 25 wt. %.

Preservative

The rinse aid composition can also include effective amount of a preservative. Often, overall acidity and/or acids in the rinse aid composition can provide a preservative and stabilizing function. Some embodiments of the inventive rinse aid composition also include a GRAS preservative system for acidification of the rinse aid including sodium bisulfate and organic acids. In at least some embodiments, the rinse aid has pH of 2.0 or less and the use solution of the rinse aid has a pH of at least pH 4.0. In some embodiments, sodium bisulfate is included in the rinse aid composition as an acid source. In other embodiments, an effective amount of sodium bisulfate and one or more other acids are included in the rinse aid composition as a preservative system. Suitable acids include for example, inorganic acids, such as HCl and organic acids. In certain further embodiments, an effective amount of sodium bisulfate and one or more organic acids are included in the rinse aid composition as a preservative system. Suitable organic acids include sorbic acid, benzoic acid, ascorbic acid, erythorbic acid, citric acid, etc. Preferred organic acids include benzoic and ascorbic acid. Generally, effective amounts of sodium bisulfate with or without additional acids are included such that a use solution of the rinse aid composition has a pH that shall be less than pH 4.0, often less pH 3.0, and may be even less than pH 2.0.

Preferred preservatives for use in the rinse aid compositions include, sodium pyrithione, methylchloroisothiazolinone, methylisothiazolinone, or a blend ofthe same. A blend of methylchloroisothiazolinone and methylisothiazolinone is available from Dow Chemical under the trade name KATHON™ CG.

When a preservative is included in the rinse aid compositions, it can be present from about 0.01 to about 10 wt. %; preferably from about 0.05 to about 5 wt. %; more preferably from about 0.1 to about 2 wt. %; and even more preferably from about 0.1 to about 1 wt. %.

Bleaching Agents

The rinse aid can optionally include bleaching agent. Bleaching agent can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A rinse aid composition may include a minor but effective amount of a bleaching agent, for example, in some embodiments, in the range of up to about 10 wt. %, and in some embodiments, in the range of about 0.1 to about 6 wt. %.

Activators

In some embodiments, the antimicrobial activity or bleaching activity of the rinse aid can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine;

transition metal; compound that includes carboxylic, nitrile, amine, or ester moiety; or mixtures thereof.

In some embodiments, an activator component can include in the range of up to about 75% by wt. of the composition, in some embodiments, in the range of about 0.01 to about 20% by wt, or in some embodiments, in the range of about 0.05 to 10% by weight of the composition. In some embodiments, an activator for an active oxygen compound combines with the active oxygen to form an antimicrobial agent.

In some embodiments, the rinse aid composition includes a solid, such as a solid flake, pellet, or block, and an activator material for the active oxygen is coupled to the solid. The activator can be coupled to the solid by any of a variety of methods for coupling one solid composition to another. For example, the activator can be in the form of a solid that is bound, affixed, glued or otherwise adhered to the solid of the rinse aid composition. Alternatively, the solid activator can be formed around and encasing the solid rinse aid composition. By way of further example, the solid activator can be coupled to the solid rinse aid composition by the container or package for the composition, such as by a plastic or shrink wrap or film.

Fillers

The rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1-15 wt. %. Sodium sulfate is conventionally used as inert filler.

Anti-Redeposition Agents

The rinse aid composition can optionally include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A rinse aid composition may include up to about 10 wt. %, and in some embodiments, in the range of about 1 to about 5 wt. %, of an anti-redeposition agent.

Dyes/Odorants

Various dyes, odorants including perfumes, and other aesthetic enhancing agents may also be included in the rinse aid. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Functional Polydimethylsiloxones

The composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provide excellent rinse aids on plasticware. We have also found that the combination of certain silicone polysiloxane copolymers and fluorocarbon surfactants with conventional hydrocarbon surfactants also provide excellent rinse aids on plasticware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

In some embodiments, the composition may include functional polydimethylsiloxones in an amount in the range of up to about 10 wt-%. For example, some embodiments may include in the range of about 0.1 to 10 wt-% of a polyalkylene oxide-modified polydimethylsiloxane or a polybetaine-modified polysiloxane, optionally in combination with about 0.1 to 10 wt-% of a fluorinated hydrocarbon nonionic surfactant.

Humectant

The composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition.

Other Ingredients

A wide variety of other ingredients useful in providing the particular composition being formulated to include desired properties or functionality may also be included. For example, the rinse aid may include other active ingredients, such as pH modifiers, buffering agents, cleaning enzyme, carriers, processing aids, or others, and the like.

Additionally, the rinse aid can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of about 3 to about 5, or in the range of about 5 to about 9. Liquid product formulations in some embodiments have a (10% dilution) pH in the range of about 2 to about 4. Techniques for controlling pH at recommended usage levels include the use of buffers, alkali, acids, etc., and are well known to those skilled in the art.

Processing and/or Manufacturing of the Composition

The invention also relates to a method of processing and/or making the solid rinse aid composition. The solid rinse aid composition is generally provided as a solid concentrate, e.g., block. In general, it is expected that the solid rinse aid composition will be diluted with water to provide the use solution that is then supplied to the surface of a substrate, for example, during a rinse cycle. The use solution preferably contains an effective amount of active material to provide reduced water solids filming in high solids containing water.

It should be understood that compositions and methods embodying the invention are suitable for preparing a variety of solid compositions, as for example, a cast, extruded, molded or formed solid pellet, block, tablet, pressed solid and the like. In some embodiments, the solid composition can be formed to have a weight of 50 grams or less, while in other embodiments, the solid composition can be formed to have a weight of 50 grams or greater, 500 grams or greater, or 1 kilogram or greater. For the purpose of this application the term "solid block" includes cast, pressed, formed, or extruded materials having a weight of 50 grams or greater. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The present invention is particularly suited to extrusion solid formation although other methods may be used. In an exemplary embodiment, a single- or twin-screw extruder may be used to combine and mix one or more components agents at high shear to form a homogeneous mixture.

Applicants have found that the order of mixture of the components is important in achieving the hardening necessary for proper extrusion, when this method is used. Order of addition, temperature and environment are all important factors.

The processed mixture may be dispensed from the mixer by pressing, forming, extruding or other suitable means, whereupon the composition hardens to a solid form. The structure of the matrix may be characterized according to its hardness, melting point, material distribution, crystal structure, and other like properties according to known methods in the art. Generally, a solid composition processed according to the method of the invention is substantially homogeneous with regard to the distribution of ingredients throughout its mass and is dimensionally stable.

The present solid composition can also be made by pressing the solid composition. Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds.

The mixture is then discharged from the mixing system into, or through, a die, press or other shaping means. The product is then packaged. In an exemplary embodiment, the solid formed composition begins to harden between approximately 1 minute and approximately 3 hours. Particularly, the formed composition begins to harden in between approximately 1 minute and approximately 2 hours. More particularly, the formed composition begins to harden in between approximately 1 minute and approximately 20 minutes.

The method of the present invention can produce a stable solid without employing a melt and solidification of the melt as in conventional casting. Forming a melt requires heating a composition to melt it. The heat can be applied externally or can be produced by a chemical exotherm (e.g., from mixing caustic (sodium hydroxide) and water). Heating a composition consumes energy. Handling a hot melt requires safety precautions and equipment. Further, solidification of a melt requires cooling the melt in a container to solidify the melt and form the cast solid. Cooling requires time and/or energy. In contrast, the present method can employ ambient temperature and humidity during solidification or curing of the present compositions. The solids of the present invention are held together not by solidification from a melt but by a binding agent produced in the admixed particles and that is effective for producing a stable solid.

The resulting solid composition may take forms including, but not limited to: an extruded, molded or formed solid pellet, block, tablet, powder, granule, flake; or the formed solid can thereafter be ground or formed into a powder, granule, or flake. In an exemplary embodiment, extruded pellet materials formed have a weight of between approximately 50 grams and approximately 250 grams, extruded solids have a weight of approximately 100 grams or greater, and solid blocks formed have a mass of between approximately 1 and approximately 10 kilograms. The solid compositions provide for a stabilized source of functional materials. In a preferred embodiment, the solid composition may be dissolved, for example, in an aqueous or other medium, to create a concentrated and/or use solution. The solution may be directed to a storage reservoir for later use and/or dilution, or may be applied directly to a point of use.

In certain embodiments, the solid rinse aid composition is provided in the form of a unit dose. A unit dose refers to a solid rinse aid composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid rinse aid composition is provided in the form of a multiple-use solid, such as, a block or a plurality of pellets, and can be repeatedly used to generate aqueous rinse compositions for multiple washing cycles. In certain embodiments, the solid rinse aid composition is provided as a solid having a mass of about 5 g to 10 kg. In certain embodiments, a multiple-use form of the solid rinse aid composition has a mass of about 1 to 10 kg. In further embodiments, a multiple-use form of the solid rinse aid composition has a mass of about 5 kg to about 8 kg. In other embodiments, a multiple-use form of the solid rinse aid composition has a mass of about 5 g to about 1 kg, or about 5 g and to 500 g.

Packaging System

In some embodiments, the solid can be packaged, for example in a container or in film. The temperature of the mixture when discharged from the mixing system can be sufficiently low to enable the mixture to be cast or extruded directly into a packaging system without first cooling the mixture. The time between extrusion discharge and packaging may be adjusted to allow the hardening of the composition for better handling during further processing and packaging. In some embodiments, the mixture at the point of discharge is in the range of about 100 to 140° F. In certain other embodiments, the mixture is processed at temperatures in the range of 110-125° F. The composition is then allowed to harden to a solid form that may range from a low density, sponge-like, malleable, caulky consistency to a high density, fused solid, concrete-like solid.

The solid rinse aid composition can be, but is not necessarily, incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Rinse aid compositions may be allowed to solidify in the packaging or may be packaged after formation of the solids in commonly available packaging and sent to distribution center before shipment to the consumer.

For solids, advantageously, in at least some embodiments, since the rinse is processed at or near ambient temperatures, the temperature of the processed mixture is low enough so that the mixture may be cast or extruded directly into the container or other packaging system without structurally damaging the material. As a result, a wider variety of materials may be used to manufacture the container than those used for compositions that processed and dispensed under molten conditions. In some embodiments, the packaging used to contain the rinse aid is manufactured from a flexible, easy opening film material.

Dispensing the Rinse Aid

The rinse aid can be dispensed as a concentrate or as a use solution. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

Solid products, such as cast or extruded solid compositions, may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

In some embodiments, the rinse aid may be formulated for a particular application. For example, in some embodiments, the rinse aid may be particularly formulated for use in warewashing machines. As discussed above, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.).

Exemplary articles in the warewashing industry that can be treated with a rinse aid according to the invention include dishware, cups, glasses, flatware, and cookware. For the purposes of this invention, the terms “dish” and “ware” are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming properties. In addition to having the desirable properties described above, it may also be useful for the rinse aid to be biodegradable, environmentally friendly, and generally nontoxic. A rinse aid of this type may be described as being “food grade”.

Sample formulations of the invention are set forth below.

TABLE 3

| Exemplary Formulation | | | |
|---|---|---|---|
| Material | First Exemplary Range wt.-% | Second Exemplary Range wt.-% | Third Exemplary Range wt.-% |
| water | 0.01-4 | 0.1-3 | 0.5-2 |
| Disruption Agent | 5-40 | 7.5-27.5 | 10-25 |
| Two or more solid nonionic surfactants | 10-45 | 15-40 | 20-35 |
| Hydrotrope/coupler | 0.1-20 | 0.5-15 | 1-10 |
| Hardening agent | 0.1-75 | 1-50 | 5-30 |
| Additional Functional Ingredients | 0-30 | 1-26 | 2-20 |

EXAMPLES

Example 1: Sample Formulations of the Invention

TABLE 4

| Examples of formulations that solidify to a nice hard solid within a few seconds of leaving the extruder barrel. | | | | | |
|---|---|---|---|---|---|
| Raw Materials | P090241 sp5 | P090241 sp9 | P120941 sp10 | P120941 sp13 | P102841 sp2 |
| Urea | 31 | 27 | 30 | 25 | 32 |
| Plurafac LF-500 | 33 | 32 | 31 | 27 | 29 |
| Water | 1 | 1 | 1 | 1 | 1 |
| SLf-18B-45 | 11 | 11 | 0 | 0 | 10 |
| Novel 1012GB-21 | 22 | 14 | 21 | 18 | 22 |
| Dehypon E127 | 0 | 0 | 11 | 9 | 0 |
| Pluronic 25R8 | 0 | 0 | 0 | 0 | 0 |
| Sodium cumene Sulfonate 40% | 0 | 0 | 0 | 0 | 0 |
| Sodium cumene Sulfonate 93% | 2 | 14 | 6 | 20 | 0 |
| Sodium Xylene Sulfonate 96% | 0 | 0 | 0 | 0 | 6 |
| Total | 100 | 100 | 100 | 100 | 100 |
| Appearance coming out of Extruder | Solid | Solid | Solid | Solid | solid |

TABLE 5

| Examples of formulations that Did Not solidify to a hard solid within a few seconds of leaving the extruder barrel. | | | | | |
|---|---|---|---|---|---|
| Raw Materials | P090241 sp3 | P090241 sp9 | P120941 sp5 | P120941 sp5 | P102841 sp8 |
| Urea | 30 | 29 | 40 | 41 | 33 |
| Plurafac LF-500 | 31 | 30 | 39 | 28 | 36 |
| Water | 1 | 1 | 1 | 1 | 1 |
| SLf-18B-45 | 11 | 00 | 14 | 9 | 0 |
| Novel 1012GB-21 | 0 | 34 | 0 | 0 | 11 |
| Dehypon E127 | 21 | 0 | 0 | 0 | 0 |
| Pluronic 25R8 | 0 | 0 | 0 | 21 | 12 |
| Sodium cumene Sulfonate 40% | 0 | 0 | 6 | 0 | 0 |
| Sodium cumene Sulfonate 93% | 6 | 6 | 0 | 0 | 7 |
| Sodium Xylene Sulfonate 96% | 0 | 0 | 0 | 0 | 0 |
| Total | 100 | 100 | 100 | 100 | 100 |
| Appearance coming out of Extruder | Soft Extrudate | Frosting Consistency | Mushy Extrudate | Soft Solid | Goo Paste |

The following materials are used in the examples that follow:

Water

Pluronic 25R8: Polyoxypropylene polyoxyethylene block (reverse)

Plurifac LF-500: alcohol ethoxylate propoxylate

Dehypon E127: Fatty alcohol alkoxylate

SLf-18B45: alcohol alkoxylate

Novel II 1012-GB-21: alcohol ethoxylate C10-12, 21EO

The above description provides a basis for understanding the broad metes and bounds of the invention. The following examples and test data provide an understanding of certain specific embodiments of the invention. These examples are not meant to limit the scope of the invention. Unless otherwise noted, all parts, percentages, and ratios reported in the following examples are on a weight basis, and all reagents used in the examples were obtained, or are available, from the chemical suppliers described below, or may be synthesized by conventional techniques.

Formulations were made and tested per the table below. First a nice hard solid was formed without any hydrotrope. Then the SCS solid feed stream was turned on starting in small increments. This process run showed that with this base formula 2 to 13.75% hydrotrope could be added to this base formula without the base solid turning to a soft Solid.

This experiment was also successfully repeated a second time. See detailed results below.

TABLE 6

| Test Formulations | | | | | | | | | | |
|---|---|---|---|---|---|---|---|---|---|---|
| Surfactant | | | | | | Other | | | | |
| H2O | LF-500 | SLF-188-45 | Novel | 25R8 | E127 | SCS 40% | SCS 93% | SCS 96% | Urea | Comment |
| 2 | 43 | 15 | 5 | 0 | 0 | 0 | 0 | 0 | 35 | Soft solid, tacky surface, soft after several hours (sp1) |
| 1 | 32 | 11 | 21 | 0 | 0 | 0 | 0 | 0 | 35 | Block very hard changed to avoid lock up (sp2) |
| 1 | 36 | 12 | 23 | 0 | 0 | 0 | 0 | 0 | 28 | Softer, solidified over time (sp3) |
| 1 | 34 | 12 | 22 | 0 | 0 | 0 | 0 | 0 | 32 | Much harder than sp3; less tacky (sp4) |
| 1 | 33 | 11 | 22 | 0 | 0 | 0 | 2 | 0 | 31 | Very hard with scs (sp5) |
| 1 | 32 | 11 | 21 | 00 | 00 | 0 | 6 | 0 | 30 | Smooth hard solid; looks very good (sp6) |
| 1 | 35 | 12 | 16 | 0 | 0 | 0 | 6 | 0 | 30 | Tackier than sp6; still hard and smooth; looks good (sp7) |
| 1 | 34 | 11 | 15 | 0 | 0 | 0 | 10 | 0 | 29 | Slightly softer and tackier than sp7 (sp8) |
| 1 | 32 | 11 | 15 | 0 | 0 | 0 | 14 | 0 | 28 | Slightly softer and tackier; still good (sp9) |
| 1 | 36 | 12 | 9 | 00 | 0 | 0 | 14 | 0 | 28 | Softer than sp9 (sp10) |
| 1 | 39 | 13 | 5 | 0 | 0 | 0 | 14 | 0 | 28 | Very soft (sp11) |
| 2 | 46 | 16 | 5 | 0 | 0 | 0 | 0 | 0 | 32 | Slightly harder when scs removed; similar to sp1 (sp12) |

TABLE 7

| Test formulations | | | | | | | | | | |
|---|---|---|---|---|---|---|---|---|---|---|
| Surfactant | | | | | | Other | | | | |
| H2O | LF-500 | SLF-188-45 | Novel | 25R8 | E127 | SCS 40% | SCS 93% | SCS 96% | Urea | Comment |
| 1 | 33 | 11 | 22 | 0 | 0 | 0 | 2 | 0 | 31 | Very hard tearing; some issue feeding in SCS at that low of rate (set pt 5) |
| 1 | 32 | 11 | 21 | 0 | 0 | 0 | 6 | 0 | 30 | Smooth hard solid; looks very good (set pt 6) |
| 1 | 35 | 12 | 16 | 0 | 0 | 0 | 6 | 0 | 30 | Smooth hard solid; looks good; tackier than sp6 (set pt 7) |
| 1 | 34 | 32 | 15 | 0 | 0 | 0 | 10 | 0 | 29 | Slightly softer and tackier than sp7 (set pt 8) |
| 1 | 36 | 11 | 15 | 0 | 0 | 0 | 14 | 0 | 28 | Slightly softer and tackier than sp8 but still good; slimy surface; could decrease die temp to solve issue (set pt 9) |

After making this discovery that theory is that there is some kind of a synergy phenomenon happening with this surfactant package namely the SLF-18B-45 and the Novel 1012GB-21 that could be allowing the urea inclusion to happen and prevent the coupler/hydrotrope used at low levels from interfering with the solidification of the hard solid in the short time that the extrusion process allows for a hard solid to form. To test this theory other surfactants were tried in the formula by replacing the Novel 1012GB-21or the SLF-18B-45 independently of each other. The experiments below show that replacing the Novel 1012GB-21 or the SLF-18B-45 independently with Pluronic 25R8 does not form a hard solid. Set point six from also repeated in this experiment below to see if another coupler/hydrotrope sodium xylene sulfonate could replace the sodium cumene sulfonate to still form a nice hard solid. Set point two shows that the SCS can be replaced by the SXS and still form a nice hard solid. See detailed results below.

TABLE 8

| Test formulations | | | | | | | | | | |
|---|---|---|---|---|---|---|---|---|---|---|
| | Surfactant | | | | | Other | | | | |
| H2O | LF-500 | SLF-188-45 | Novel | 25R8 | E127 | SCS 40% | SCS 93% | SCS 96% | Urea | Comment |
| 1 | 29 | 10 | 22 | 0 | 0 | 0 | 6 | 0 | 32 | Nice solid (set pt 1) |
| 1 | 29 | 10 | 22 | 0 | 0 | 0 | 0 | 6 | 32 | Nice solid (set pt 2) |
| 1 | 27 | 9 | 0 | 21 | 0 | 0 | 0 | 0 | 41 | Went from 34 to 41 urea and still could not harden; still soft after 45 min (set pt 5) |
| 1 | 34 | 0 | 22 | 11 | 0 | 0 | 0 | 0 | 32 | Mushy; did not fill the mold shape (set pt 6) |
| 1 | 36 | 0 | 11 | 12 | 0 | 0 | 7 | 0 | 33 | Goo (set pt 8) |

In this set of experiments on the extruder performed the SLF-18B-45 and Novel 1012GB-21 were each replaced independently with Dehypon E127 to see if solidification could still be achieved in the presence of low levels of a coupler/hydrotrope. Replacing the Novel 1012 II GB 21 for the E 127 produced a soft/mushy extrudate while replacing the SLF-18B-45 with E127 produced a nice hard solid with SCS levels ranging from 5 to 20 plus percent which was slightly higher than the successful runs with SLF-18B-45/Novel 1012 II GB 21 combinations.

In set point 9 of this run we tried just replacing the SLF-18B-45 with a much higher ratio of total novel. This set point produced a mushy. Based on the different surfactants tried in all of the extrusion runs the theory is that there is some kind of a synergy phenomenon happening with the solid surfactants tried that have higher ratios of EO in them which gives them a higher melt point. This could be allowing the urea inclusion to happen and preventing the coupler/hydrotrope used at low levels in the formulation from interfering with the solidification of the solid in the short time that the extrusion process allows for a hard solid to form. The solid must be hard by the time is leaves the barrel of the extruder. See detailed results below.

TABLE 9

| Results | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 32 | 11 | 21 | 0 | 0 | 0 | 6 | 0 | 30 | Solid slight peeling slight sticky (set pt1) |
| 1 | 32 | 11 | 21 | 0 | 0 | 0 | 6 | 0 | 30 | No change from set pt 1 (set pt 2) |
| 1 | 32 | 11 | 0 | 0 | 21 | 0 | 6 | 0 | 30 | Extrudent softer (set pt 3) |
| 1 | 30 | 10 | 0 | 0 | 20 | 0 | 11 | 0 | 28 | Turned to mush (set pt 4) |
| 1 | 32 | 21 | 11 | 0 | 0 | 0 | 6 | 0 | 30 | Harder, minor peeling, similar to set pt 1 (set pt 5) |
| 1 | 30 | 20 | 10 | 0 | 0 | 0 | 11 | 0 | 28 | Slightly softer then set pt 5 (set pt 6) |
| 1 | 28 | 19 | 10 | 0 | 0 | 0 | 16 | 0 | 27 | Softer than set pt 6 (set pt 7) |
| 1 | 30 | 24 | 10 | 0 | 0 | 0 | 6 | 0 | 29 | Slightly softer gooey texture (set pt 8) |
| 1 | 30 | 0 | 34 | 0 | 0 | 0 | 6 | 0 | 29 | Frosting consistency Only one solid Surf at same amount as if there were two (set pt 9) |
| 1 | 32 | 0 | 21 | 0 | 11 | 0 | 6 | 0 | 30 | Added 2nd surfactant system to see transition more clearly. Much harder, slightly sticky (set Pt 10) |
| 1 | 30 | 0 | 20 | 0 | 10 | 0 | 11 | 0 | 28 | Harder, smoother than SP 10 (set pt 11) |
| 1 | 28 | 0 | 19 | 0 | 10 | 0 | 16 | 0 | 27 | harder, smoother than SP 11 (set pt12) |
| 1 | 27 | 0 | 18 | 0 | 9 | 0 | 20 | 0 | 25 | Good hard solid (set pt13) |
| 1 | 22 | 0 | 14 | 0 | 8 | 0 | 34 | 0 | 21 | SCS too high, build up in sidefeeder hopper (set pt 14) |

Over all these experimental extrusions showed that SCS can be replaced without issue with SXS. SCS can successfully be added to the formulations that used both Novel, SLF-18B-45 and Novel, E127 while none of the other surfactant combinations formed a hard solid.

Example 2

Rinse Aid Testing

50 Cycle Redisposition Evaluation

6 Glasses are placed in a rack in a diagonal line along with one plastic glass. The machine is charged with 800 ppm detergent and the desired mls for each individual rinse aid. The detergent stays the same for each rinse aid evaluated. 2000 ppm food soil is also added to the machine (accounting for volume of sump). When the test starts the detergent and rinse aid dispenser automatic doses the proper amount each cycle. The detergent is controlled by conductivity and the rinse aid is dispensed milliliters per rack. The Food soil is hand dosed for each cycle to maintain 2000 ppm. When the test is finished the glasses are allowed to dry overnight and evaluated for film accumulation. Glasses are then stained with coomassie blue to determine protein residue.

The results from the 50 cycle tests show that the commercially available Liquid rinse aid performance in this set of tests are comparable to the solid versions of solid P090241 set point 6 (SLF-18B-45/Novel) while the set point 10 (Novel/E127) and the Solid commercially available rinse aid perform slightly better than the liquid version using 800 ppm of the same detergent for each test along with 2000 ppm food soil. See detailed results in FIG. 1.

Figure 2:
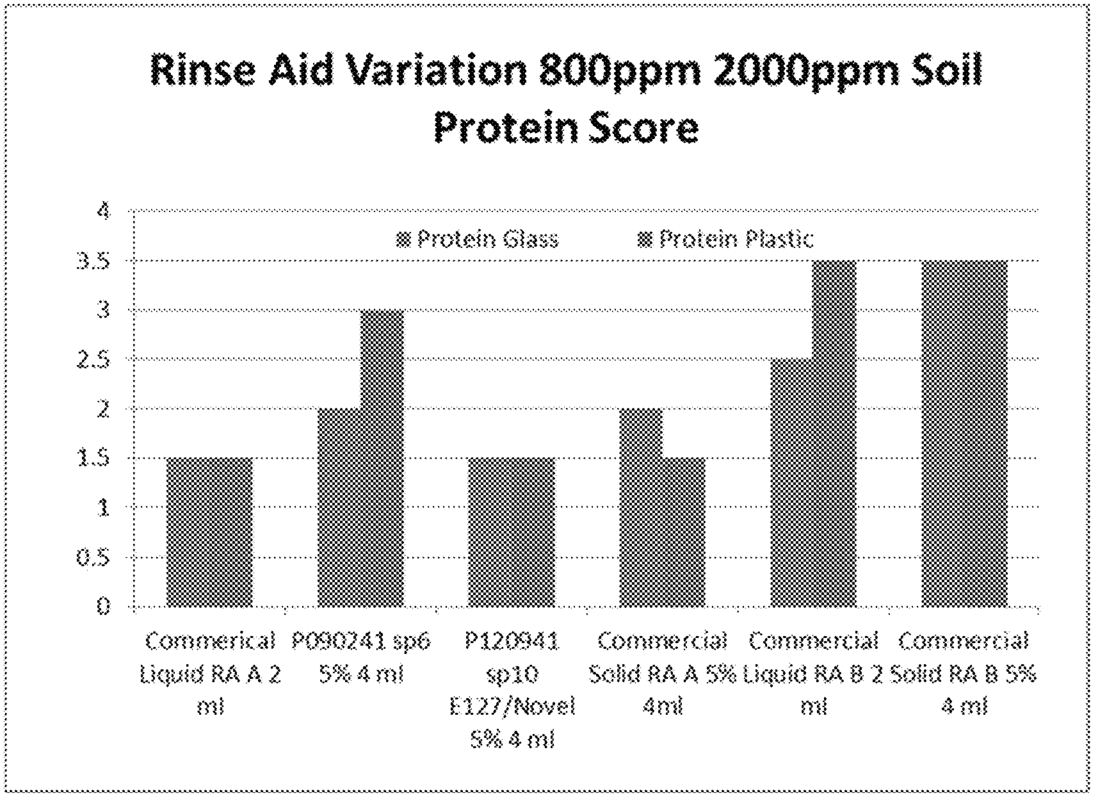
FIG. 2 is a graph showing the results of the 50 cycle tests on protein soil. The graphs shows the solid P120941 sp10 at 5% 4 ml (Novel/E127) version is equal to the Commercial Liquid Rinse Aid A at 2 ml. P090241 sp6 at 5% 4 ml (SLF-18B-45/Novel) is slightly worse for protein removal. The overall 50 cycle results show that the P120941 sp10 performs slightly better than the liquid Commercial Rinse Aid A formula on Spot, Film and Protein soil removal based on these results.

The 50 cycle results on protein soil show that the solid P120941 sp10 (Novel/E127) version is equal to the Liquid rinse aid P090241 sp6 (SLF-18B-45/Novel) is slightly worse for protein removal. The overall 50 cycle results show that the Solid P120941 sp10 performs slightly better than the liquid rinse aid formula on Spot, Film and Protein soil removal based on these results. See detailed results in FIG. 2.

Sheeting Results

Below are several sheeting evaluations using different formulas. A dotted line signifies no sheeting, a 1 means pin point sheeting and an X means complete sheeting. The test is complete once all of the ware listed has completely sheeted. The foam level in the machine is also noted. Stable foam at any level is unacceptable. Foam that is less then ½ inch that breaks to nothing as soon as the machine is shut off is acceptable and no foam is best.

The results from the sheeting tests show that all of the formulations sheet better than the Liquid commercially available rinse aid. See detailed results below.

TABLE 10

Sheeting Results
Product Commercial Liquid RA A
Water Type Soft water 0.5 grain

| ppm, Actives in Rinse Aid | 40 | 50 | 60 | 70 | 80 | 90 | 100 | 110 | 120 | 130 | 140 | 150 | 160 | 170 | 180 | 190 | 200 |
|---|---|---|---|---|---|---|---|---|---|---|---|---|---|---|---|---|---|
| Polycarbonate Tile (clear) New | — | — | — | — | — | — | — | — | — | — | — | 1 | 1 | 1 | 1 | 1 | 1 |
| Glass tumbler | — | — | — | — | — | 1 | 1 | 1 | 1 | 1 | 1 | 1 | 1 | 1 | 1 | X | X |
| China Plate | 1 | 1 | 1 | 1 | 1 | 1 | 1 | 1 | 1 | 1 | 1 | 1 | 1 | X | X | X | X |
| Melamine Plate | 1 | 1 | 1 | 1 | 1 | 1 | 1 | 1 | 1 | 1 | 1 | 1 | 1 | X | X | X | X |
| Polypropylene Cup (yellow) | — | — | — | — | — | — | — | — | — | — | — | — | — | 1 | 1 | 1 | 1 |
| Dinex Bowl (blue) | — | — | — | — | — | — | — | — | — | — | — | — | — | 1 | 1 | 1 | 1 |
| Polypropylene Jug (blue) | — | — | — | — | — | — | — | — | — | — | — | — | — | | | 1 | 1 |
| Polysulfonate Dish (clear tan) | — | — | — | — | — | — | — | — | — | 1 | 1 | 1 | 1 | 1 | 1 | 1 | 1 |
| Stainless Steel Knife | — | — | — | — | — | — | — | — | — | | | 1 | 1 | 1 | 1 | 1 | X |
| Polypropylene tray (peach) New | water droplets never pinwhole sheeted | | | | | | | | | | | | | | | | |
| Fiberglass tray (tan) New | — | — | — | — | — | — | — | 1 | 1 | 1 | 1 | 1 | 1 | 1 | 1 | 1 | 1 |
| Stainless steel slide 316 New | — | — | — | — | 1 | 1 | 1 | 1 | 1 | 1 | 1 | 1 | 1 | 1 | X | X | X |
| Temperature, ° F. | 157 | 157 | 157 | 157 | 157 | 157 | 157 | 157 | 157 | 157 | 157 | 157 | 157 | 157 | 157 | 157 | 157 |
| Suds | none | none | none | none | none | none | none | none | none | none | none | none | none | none | none | none | none |

TABLE 11

Product P090241 sp6
Water Type 17 grain

| ppm, Actives in Rinse Aid | 10 | 20 | 30 | 40 | 50 | 60 | 70 | 80 | 90 |
|---|---|---|---|---|---|---|---|---|---|
| Glass tumbler | — | — | — | — | — | — | — | 1 | X |
| China Plate | — | — | — | — | 1 | X | X | X | X |
| Melamine Plate | — | — | — | 1 | 1 | X | X | X | X |
| Polypropylene Cup (yellow) | — | — | — | — | — | — | — | 1 | X |
| Dinex Bowl (blue) | — | — | — | — | — | — | — | 1 | X |
| Polypropylene Jug (blue) | — | — | — | — | — | — | 1 | 1 | X |
| Polysulfonate Dish (clear tan) | — | — | — | — | — | — | — | 1 | X |
| Stainless Steel Knife | — | — | — | — | — | — | — | 1 | X |
| Polypropylene tray (peach) | — | — | — | — | — | 1 | 1 | X | X |
| Fiberglass tray (tan) | — | — | — | — | — | 1 | 1 | X | X |
| Stainless steel slide 316 | — | — | — | — | — | 1 | 1 | X | X |
| Temperature, ° F. | 159 | 159 | 159 | 159 | 159 | 159 | 159 | 159 | 159 |
| Suds | None | | | | | | | | |

TABLE 12

| Product P120941 sp10<br>Water Type 17 grain | | | | | | | | |
|---|---|---|---|---|---|---|---|---|
| ppm, Actives in Rinse Aid | 10 | 20 | 30 | 40 | 50 | 60 | 70 | 80 |
| Glass tumbler | — | — | — | 1 | 1 | X | X | X |
| China Plate | — | — | — | 1 | 1 | 1 | X | X |
| Melamine Plate | — | — | 1 | 1 | 1 | X | X | X |
| Polypropylene Cup (yellow) | — | — | — | 1 | 1 | 1 | 1 | X |
| Dinex Bowl (blue) | — | — | — | — | — | 1 | 1 | X |
| Polypropylene Jug (blue) | — | — | — | — | 1 | 1 | X | X |
| Polysulfonate Dish (clear tan) | — | — | — | — | 1 | 1 | X | X |
| Stainless Steel Knife | — | — | — | — | — | 1 | 1 | X |
| Polypropylene tray (peach) | — | — | — | 1 | 1 | 1 | X | X |
| Fiberglass tray (tan) | — | — | — | — | — | 1 | 1 | X |
| Stainless steel slide 316 | — | — | 1 | 1 | 1 | 1 | X | X |
| Temperature, ° F. | 156 | 156 | 156 | 156 | 156 | 156 | 156 | 156 |
| Suds | None | | | | | | | |

TABLE 13

| Product Commercial Solid RAB<br>Water Type Soft water | | | | | | | | | | | |
|---|---|---|---|---|---|---|---|---|---|---|---|
| ppm, Actives in Rinse Aid | 40 | 50 | 60 | 70 | 80 | 90 | 100 | 110 | 120 | 130 | 140 |
| Polycarbonate Tile (clear) | — | — | — | — | — | — | — | — | 1 | 1 | X |
| Glass tumbler | — | — | 1 | 1 | 1 | 1 | X | X | X | X | X |
| China Plate | — | — | 1 | 1 | X | X | X | X | X | X | X |
| Melamine Plate | — | — | 1 | 1 | X | X | X | X | X | X | X |
| Polypropylene Cup (yellow) | — | — | — | — | — | — | 1 | 1 | 1 | X | X |
| Dinex Bowl (blue) | — | — | — | — | — | — | — | 1 | 1 | X | X |
| Polypropylene Jug (blue) | — | — | — | — | — | — | — | — | X | X | X |
| Polysulfonate Dish (clear tan) | — | — | — | — | — | — | 1 | 1 | 1 | X | X |
| Stainless Steel Knife | — | — | 1 | 1 | 1 | 1 | X | X | X | X | X |
| Polypropylene tray (peach) | — | — | — | — | — | — | — | — | X | X | X |
| Fiberglass tray (tan) | — | — | — | — | — | — | 1 | 1 | X | X | X |
| Stainless steel slide 316 | — | — | 1 | 1 | 1 | X | X | X | X | X | X |
| Temperature, ° F. | 157 | 157 | 157 | 157 | 157 | 157 | 157 | 157 | 157 | 157 | 157 |
| Suds | none | none | none | none | none | none | none | none | none | none | none |

TABLE 14

| Product Commercial Solid RA A<br>Water Type Soft Water | | | | | | | | | |
|---|---|---|---|---|---|---|---|---|---|
| ppm, Actives in Rinse Aid | 40 | 50 | 60 | 70 | 80 | 90 | 100 | 110 | 120 |
| Polycarbonate Tile (clear) New | — | — | — | — | — | — | — | 1 | X |
| Glass tumbler | — | — | — | 1 | 1 | X | X | X | X |
| China Plate | — | — | — | 1 | X | X | X | X | X |
| Melamine Plate | — | — | 1 | 1 | X | X | X | X | X |
| Polypropylene Cup (yellow) | — | — | — | — | — | — | — | 1 | X |
| Dinex Bowl (blue) | — | — | — | — | — | — | 1 | 1 | X |
| Polypropylene Jug (blue) | — | — | — | — | — | 1 | X | X | X |
| Polysulfonate Dish (clear tan) | — | — | — | — | — | 1 | X | X | X |
| Stainless Steel Knife | — | — | 1 | 1 | X | X | X | X | X |

TABLE 14-continued

| Product Commercial Solid RA A<br>Water Type Soft Water | | | | | | | | | |
|---|---|---|---|---|---|---|---|---|---|
| ppm, Actives in Rinse Aid | 40 | 50 | 60 | 70 | 80 | 90 | 100 | 110 | 120 |
| Polypropylene tray (peach) New | — | — | — | — | — | — | — | 1 | X |
| Fiberglass tray (tan) New | — | — | — | — | — | 1 | 1 | X | X |
| Stainless steel slide 316 New | — | — | 1 | — | — | 1 | X | X | X |
| Temperature, ° F. | 157 | 157 | 157 | 157 | 157 | 157 | 157 | 157 | 157 |
| Suds | None | | | | | | | | |

TABLE 15

| Product Commercial Liquid RA B<br>Water Type Soft water | | | | | | | | |
|---|---|---|---|---|---|---|---|---|
| ppm, Actives in Rinse Aid | 40 | 50 | 60 | 70 | 80 | 90 | 100 | 110 |
| Polycarbonate Tile (clear) | — | — | — | — | — | 1 | 1 | X |
| Glass tumbler | — | 1 | 1 | X | X | X | X | X |
| China Plate | X | X | X | X | X | X | X | X |
| Melamine Plate | X | X | X | X | X | X | X | X |
| Polypropylene Cup (yellow) | — | — | — | — | — | 1 | 1 | X |
| Dinex Bowl (blue) | — | — | — | — | — | 1 | 1 | X |
| Polypropylene Jug (blue) | — | — | — | — | — | — | — | X |
| Polysulfonate Dish (clear tan) | — | — | — | 1 | 1 | X | X | X |
| Stainless Steel Knife | — | — | — | — | — | 1 | 1 | X |
| Polypropylene tray (peach) | — | — | — | — | — | — | 1 | X |
| Fiberglass tray (tan) | — | — | — | 1 | 1 | 1 | X | X |
| Stainless steel slide 316 | — | 1 | 1 | 1 | 1 | 1 | X | X |
| Temperature, ° F. | 150 | 150 | 150 | 150 | 150 | 150 | 150 | 150 |
| Suds | None | | | | | | | |

Dynamic Contact Angle Results

Figure 3:
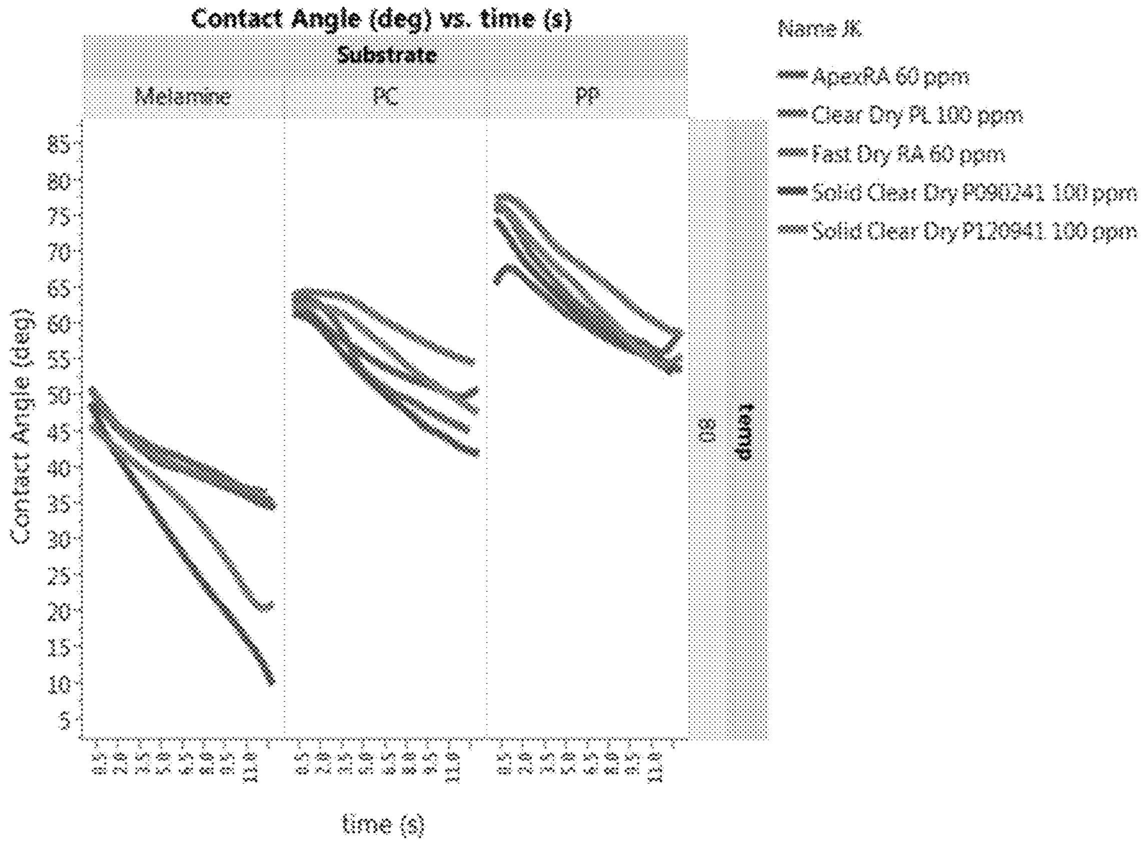
FIG. 3 is s a graph showing Dynamic contact angle data that was evaluated on Melamine, polycarbonate and polypropylene. The Commercial Liquid Rinse Aid A at 2 ml and solid formulations were evaluated at 100 ppm while the Commercial Solid Rinse Aid B at 5% 4 ml and Commercial Liquid Rinse Aid B were evaluated at 60 ppm. The temperature of the substrate and the liquid were tested at 80° C. Results show that the Commercial Liquid B and Solid Commercial B formulations are very comparable in performance.

The contact angle measures the angle where the edge of the liquid droplet and the substrate make contact. Consider a fixed volume of a liquid on a substrate; if the contact angle is low, the liquid will spread to a flatter drop with a larger volume; if the contact angle is high, the liquid will "bead up" (smaller contact area but taller drop). Though the overall mechanisms are extremely complicated, we believe that low contact angle, which is related to good wetting, has good correlation with good sheeting, faster drainage, with less spot and film Dynamic contact angle data was evaluated on Melamine, polycarbonate and polypropylene. The liquid and solid formulations were evaluated at 100 ppm while the Commercial Solid RA B and Commercial liquid RA B were evaluated at 60 ppm. The temperature of the substrate and the liquid were tested at 80° C. Results show that the Commercial liquid RA A and Commercial Solid RA B formulations are very comparable in performance. See detailed results in FIG. 3. Overall all the testing performed on the Commercial Liquid RA A versus the P090241 sp6 and P120941 sp10 are as good as if not slightly better than the Commercial liquid RA A.

Sheeting Evaluation

This test involves observation of water sheeting on twelve different types of warewash materials. The materials used for the evaluation are a 10 oz. glass tumbler, a china dinner plate, a melamine dinner plate, a polypropylene coffee cup, a dinex bowl, a polypropylene jug, a polysulfonate dish, a stainless steel butter knife, a polypropylene café tray, a fiberglass café tray and a stainless steel slide 316. These test materials are meticulously cleaned and then soiled with a solution containing a 0.2% Hotpoint soil which is a mixture of powder milk and margarine. The materials are then exposed to 30 second wash cycles using 160° F. soft water (for high temperature evaluations). The test product is measured in parts per million actives. Immediately after the warewash materials are exposed to the test product the appearance of the water draining off of the individual test materials (sheeting) is examined.

Dynamic Contact Angle Measurement

The test is used to quantitatively measure the angle at which a drop of solution contacts a test substrate. The rinse aid or surfactant(s) of desired concentration is created, than placed into the apparatus. The solution and the coupon are then heated up in the chamber to the desired temperature. A single drop of solution can be delivered to a test substrate of a polypropylene coupon, a polycarbonate coupon and a melamine coupon. The deliverance of the drop to the substrate is recorded by a camera. The video captured by the camera is sent to a computer were the contact angle can be determined. The lower the contact angle the better the solution will induce sheeting. This means that the dishware will dry more quickly and with fewer spots once it has been removed from the dish machine.

50 Cycle Redisposition Evaluation

6 Glasses are placed in a rack in a diagonal line along with one plastic glass. The machine is charged with 0.08% detergent and the desired mls for each individual rinse aid. The detergent stays the same for each rinse aid evaluated. 0.2% food soil is also added to the machine (accounting for volume of sump). When the test starts the detergent and rinse aid dispensers automatic dose the proper amount each cycle. The detergent is controlled by conductivity and the rinse aid is dispensed in milliliters per rack. The Food soil is hand dosed for each cycle to maintain 0.2% concentration. When the test is finished the glasses are allowed to dry overnight and evaluated for film accumulation. Glasses are then stained with coomassie blue to determine protein residue.

Example 3

Next extrusion runs were made with the P021051 and the P041051. The first run P021051 was preformed to see how the addition of chelators/water conditioners and polymers would affect the solidification we added them separate and then in combination and then also increased the level of coupler. All of these experiments produced a nice hard solid. In the past when we had a nice hard solid and then introduced a feed stream of hydrotrope, coupler, or water conditioner (SXS, SCS Dequest) the product would always go from a hard solid to a soft paste. In each of the changes made we were able to keep a nice hard solid with the addition of 1-3 of these raw materials alone and it combination and also then increasing the level of SCS.

For experimental run P041051 Pluronic F108 did not make a nice hard solid with any of the set points tried. The AT25 worked with both the Novel 1012 II GB 21 and the SLF-18B. We also replaced the LF500 with RA300 and LF-221 both set point produced a hard solid. All runs had a constant 5.94% SCS present.

TABLE 16

| P060341 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 2 | 46 | 18 | 0 | 0 | 0 | 0 | 0 | 0 | 35 | Sticky slightly soft (set pt 1) |
| 2 | 45 | 17 | 0 | 0 | 0 | 0 | 0 | 0 | 36 | Decreased screw speed to nice solid (set pt 1.1) |
| 1 | 42 | 14 | 0 | 0 | 0 | 6 | 0 | 0 | 37 | Switched to 2nd surfactant system extrudate mushy (set pt 3) |
| 1 | 29 | 10 | 0 | 0 | 0 | 4 | 0 | 0 | 56 | increase urea locked extruder (set pt 4) |

TABLE 16-continued

| P060341 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 39 | 14 | 0 | 0 | 0 | 6 | 0 | 0 | 40 | Mushy extrudate (set pt 5) |
| 1 | 38 | 13 | 0 | 0 | 0 | 5 | 0 | 0 | 43 | Mushy extrudate (set pt 6) |
| 1 | 36 | 12 | 0 | 0 | 0 | 5 | 0 | 0 | 45 | Mushy extrudate (set pt 7) |
| 1 | 32 | 11 | 5 | 0 | 0 | 5 | 0 | 0 | 45 | hard solid locked extruder using 3rd surfactant system (set pt 8) |

TABLE 17

| P080741 | | | | | | | | | | |
|---|---|---|---|---|---|---|---|---|---|---|
| | Surf. Premix | | | | | Other | | | | |
| H20 | LF-500 | SLF-18B-45 | Novel | 25R8 | E127 | SCS 40% | SCS 93% | SXS 96% | Urea | Comment |
| 1 | 32 | 11 | 6 | 0 | 0 | 0 | 0 | 0 | 50 | Solid Tacky (set pt1) |
| 1 | 25 | 8 | 16 | 0 | 0 | 0 | 0 | 0 | 50 | Solid very hard (set pt2) |
| 1 | 32 | 11 | 21 | 0 | 0 | 0 | 0 | 0 | 35 | Mushy would not solidify (set pt3) |
| 1 | 27 | 9 | 17 | 0 | 0 | 0 | 0 | 0 | 45 | Soft but has potential (set pt 4) |
| 1 | 24 | 8 | 16 | 0 | 0 | 0 | 2 | 0 | 49 | Soft but has potential (set pt 5) |
| 1 | 23 | 8 | 15 | 0 | 0 | 0 | 7 | 0 | 47 | Mushy would not solidify (set pt 6) |

TABLE 18

| P090241 | | | | | | | | | | |
|---|---|---|---|---|---|---|---|---|---|---|
| | Surfsurfactant | | | | | Other | | | | |
| H20 | LF-500 | SLF-18B-45 | Novel | 25R8 | E127 | SCS 40% | SCS 93% | SXS 96% | Urea | Comment |
| 2 | 44 | 15 | 5 | 0 | 0 | | 0 | 0 | 35 | Soft solid, tacky surface, soft after several hours (sp1) |
| 1 | 32 | 11 | 21 | 0 | 0 | | 0 | 0 | 35 | Block very hard changed to avoid lock up. (sp2) |
| 1 | 36 | 12 | 23 | 0 | 0 | | 0 | 0 | 28 | Softer, solidified over time (sp3) |
| 1 | 34 | 12 | 22 | 0 | 0 | | 0 | 0 | 32 | Much harder than sp3 less tacky (sp4) |
| 1 | 33 | 11 | 22 | 0 | 0 | | 2 | 0 | 31 | Very hard with scs (sp5) |
| 1 | 32 | 11 | 21 | 0 | 0 | | 6 | 0 | 30 | Smooth hard solid looks very good (sp6) |
| 1 | 35 | 12 | 16 | 0 | 0 | | 6 | 0 | 30 | Tackier than sp6 still hard smooth solid looks good (sp7) |
| 1 | 34 | 11 | 15 | 0 | 0 | | 10 | 0 | 29 | Slightly softer and tackier than sp7 (sp 8) |
| 1 | 32 | 11 | 15 | 0 | 0 | | 14 | 0 | 28 | Slightly softer & tackier, still good (sp9) |
| 1 | 36 | 12 | 9 | 0 | 0 | | 14 | 0 | 28 | Softer than sp 9 (sp10) |
| 1 | 39 | 13 | 5 | 0 | 0 | | 14 | 0 | 28 | very soft (sp11) |
| 2 | 46 | 16 | 5 | 0 | 0 | | 0 | 0 | 32 | slightly harder when scs removed similar to sp1 (sp12) |

TABLE 19

| P091641 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 33 | 11 | 22 | 0 | 0 | 0 | 2 | 0 | 31 | very hard tearing some issue feeding in SCS at that low of rate (set pt 5) |
| 1 | 32 | 11 | 21 | 0 | 0 | 0 | 6 | 0 | 30 | smooth hard solid looks very good (set pt 6) |
| 1 | 35 | 12 | 16 | 0 | 0 | 0 | 6 | 0 | 30 | smooth hard solid looks good tacker the sp6 (set pt 7) |
| 1 | 34 | 32 | 15 | 0 | 0 | 0 | 10 | 0 | 29 | slightly softer and tacker then sp7 (set pt 8) |
| 1 | 36 | 11 | 15 | 0 | 0 | 0 | 14 | 0 | 28 | slightly softer and tacker then sp8 but still good slimy surface could decrease die temp to solve issue (set pt 9) |

TABLE 20

| P102841 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 29 | 10 | 22 | 0 | 0 | 0 | 6 | 0 | 32 | Nice solid (set pt 1) |
| 1 | 29 | 10 | 22 | 0 | 0 | 0 | 0 | 6 | 32 | Nice solid (set pt 2) |
| 1 | 27 | 9 | 0 | 21 | 0 | 0 | 0 | 0 | 41 | went from 34.04 to 40.8 urea and still couldn't harden. Still soft after 45 min (set pt5) |
| 1 | 34 | 0 | 22 | 12 | 0 | 0 | 0 | 0 | 32 | mushy didn't fill the mold shape (set pt 6) |
| 1 | 36 | 0 | 11 | 12 | 0 | 0 | 7 | 0 | 33 | goo (set pt 8) |

TABLE 21

| P120941 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 32 | 11 | 21 | 0 | 0 | 0 | 6 | 0 | 30 | Solid slight peeling slight sticky (set pt1) |
| 1 | 32 | 11 | 21 | 0 | 0 | 0 | 6 | 0 | 30 | No change from set pt 1 (set pt 2) |
| 1 | 32 | 11 | 0 | 0 | 21 | 0 | 6 | 0 | 30 | Extrudate softer (set pt 3) |
| 1 | 30 | 10 | 0 | 0 | 20 | 0 | 11 | 0 | 28 | Turned to mush (set pt 4) |
| 1 | 32 | 21 | 11 | 0 | 0 | 0 | 6 | 0 | 30 | Harder, minor peeling, similar to set pt 1 (set pt 5) |
| 1 | 30 | 20 | 10 | 0 | 0 | 0 | 11 | 0 | 28 | Slightly softer then set pt 5 (set pt 6) |
| 1 | 28 | 19 | 10 | 0 | 0 | 0 | 16 | 0 | 27 | Softer than set pt 6 (set pt 7) |
| 1 | 30 | 24 | 10 | 0 | 0 | 0 | 6 | 0 | 29 | Slightly softer gooey texture (set pt 8) |

TABLE 21-continued

| P120941 | | | | | | | | | | |
|---|---|---|---|---|---|---|---|---|---|---|
| | Surfactant | | | | | Other | | | | |
| H20 | LF-500 | SLF-18B-45 | Novel | 25R8 | E127 | SCS 40% | SCS 93% | SXS 96% | Urea | Comment |
| 1 | 30 | 0 | 34 | 0 | 0 | 0 | 6 | 0 | 29 | Frosting consistency Only one solid Surf at same amount as if there were two (set pt 9) |
| 1 | 32 | 0 | 21 | 0 | 11 | 0 | 6 | 0 | 30 | Added 2nd surfactant system to see transition more clearly. Much harder, slightly sticky (set Pt 10) |
| 1 | 30 | 0 | 20 | 0 | 10 | 0 | 11 | 0 | 28 | Harder, smoother than SP 10 (set pt 11) |
| 1 | 28 | 0 | 19 | 0 | 10 | 0 | 16 | 0 | 27 | harder, smoother than SP 11 (set pt12) |
| 1 | 27 | 0 | 18 | 0 | 9 | 0 | 20 | 0 | 25 | Good hard solid (set pt13) |
| 1 | 22 | 0 | 14 | 0 | 8 | 0 | 34 | 0 | 21 | SCS too high, build up in sidefeeder hopper (set pt 14) |

TABLE 22

| P021051 | | | | | | | | |
|---|---|---|---|---|---|---|---|---|
| | Surfactant | | | Other | | | | |
| H20 | LF-500 | Novel | E127 | SCS 93% | Dequest 2016D | Acusol 445ND | Urea | Comments |
| 1 | 32 | 21 | 11 | 6 | 0 | 0 | 29 | Hard Solid (set pt1) |
| 1 | 33 | 21 | 11 | 0 | 3 | 0 | 31 | Very hard minor peeling (set pt2) |
| 1 | 30 | 21 | 10 | 6 | 3 | 0 | 29 | Slightly softer than sp2, but still very good (set pt3) |
| 1 | 26 | 21 | 9 | 6 | 3 | 6 | 29 | Very hard solid, no peeling (set pt4) |
| 1 | 28 | 20 | 9 | 6 | 3 | 6 | 28 | Slightly softer than 4 good consistency but more voids (set pt 5) |
| 1 | 24 | 20 | 8 | 10 | 3 | 6 | 28 | Very hard solid (set pt6) |
| 1 | 22 | 18 | 8 | 18 | 3 | 5 | 25 | Slimier, starting to build-up in sidefeeder (set pt7) |
| 1 | 23 | 19 | 8 | 14 | 3 | 6 | 27 | Good hard solid (set pt 8) |
| 1 | 32 | 21 | 11 | 6 | 0 | 0 | 29 | Inconsistent solid not filling die without back pressure (set pt9) |

TABLE 23

| P041051 | | | | | | | | | | |
|---|---|---|---|---|---|---|---|---|---|---|
| | Surfactant | | | | | | | Other | | |
| H20 | LF-500 | SLF-18B-45 | Novel | RA300 | LF-221 | Pluronic F108 | Lutensol AT 25 | SCS 90% | Urea | Comments |
| 1 | 32 | 11 | 21 | 0 | 0 | 0 | 0 | 6 | 30 | Good solid, tacky (set pt 1) |
| 1 | 32 | 11 | 0 | 0 | 0 | 21 | 0 | 6 | 30 | Didn't complete flow issue with the F108 (set pt 2) |
| 1 | 32 | 11 | 0 | 0 | 0 | 0 | 21 | 6 | 30 | Good solid, Harder than SP1 slightly tacky (set pt 3) |
| 1 | 32 | 0 | 11 | 0 | 0 | 0 | 21 | 6 | 30 | Good hard solid, minor peeling, less tacky then sp3 (set pt 4) |
| 1 | 32 | 0 | 11 | 0 | 0 | 21 | 0 | 6 | 30 | Didn't complete flow issues with the F108 (set pt 5) |
| 1 | 32 | 0 | 21 | 0 | 0 | 11 | 0 | 6 | 30 | flow issues with F108 didn't complete (set pt 6) |

TABLE 23-continued

| P041051 | | | | | | | | | | |
|---|---|---|---|---|---|---|---|---|---|---|
| | Surfactant | | | | | | | Other | | |
| H20 | LF-500 | SLF-18B-45 | Novel | RA300 | LF-221 | Pluronic F108 | Lutensol AT 25 | SCS 90% | Urea | Comments |
| 1 | 32 | 0 | 21 | 0 | 0 | 0 | 11 | 6 | 30 | Hard solid, minor tearing (set pt7) |
| 1 | 0 | 11 | 21 | 32 | 0 | 0 | 0 | 6 | 30 | smooth hard solid (set pt 8) |
| 1 | 0 | 11 | 21 | — | 32 | 0 | 0 | 6 | 30 | softer solid, but still good. Smooth, some periodic voids (set pt 9) |

What is claimed is:

1. A solid rinse aid composition comprising:

(a) two or more solid nonionic surfactants, (b) an association disruption agent, wherein said disruption agent is one of: a C12-C16 alcohol alkoxylate with 7 moles of PO and 5 moles of EO, a butoxy capped alcohol ethoxylate, or a fatty alcohol alkoxylate (EO or EO/PO) surfactant;

(c) from about 0.1 wt % to about 15 wt. % of a coupler/hydrotrope comprising one or more short chain alkyl benzene and/or alkyl naphthalene sulfonates;

(d) a hardening agent and (e) water, wherein the composition is free of polyoxypropylene-polyoxyethylene reverse block copolymers.

2. The solid rinse aid of claim 1 wherein said short chain alkyl benzene and/or alkyl naphthalene sulfonate includes one or more of: sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene.

3. The solid rinse aid of claim 1 wherein said solid surfactant includes two or more of a C10-C12 alcohol alkoxylate with 21 moles of EO, a linear C8-C10 alcohol alkoxylate with 20 moles of EO capped epoxydecane, a C16-C18 alkyl alcohol ethoxylate with 25 moles of EO, and a modified fatty alcohol polyglycolether.

4. The solid rinse aid of claim 1 wherein said two or more solid nonionic surfactants include from about 10 wt % to about 45 wt % of said rinse aid.

5. The composition of claim 1 further comprising a preservative, sequestering agent, and/or threshold inhibitor.

6. The composition of claim 5 wherein said preservative is sodium pyrithione.

7. The solid rinse aid of claim 1 wherein said association disruption agent comprises from about 5 wt % to about 40 wt % of said rinse aid.

8. The solid rinse aid of claim 1 wherein said hardening agent is urea.

9. The composition of claim 1 further comprising a low foaming nonionic surfactant.

10. The solid rinse aid of claim 1 wherein said solid is formed by extrusion.

11. A method for rinsing a hard surface in a cleaning application comprising:

a. providing a solid rinse aid composition according to claim 1;

b. contacting the rinse aid composition with water to form a use solution; and c. applying the use solution to the hard surface.

12. The method of claim 11 wherein said use solution comprises 2,000 ppm or less active materials.

13. The method of claim 11 wherein said contacting is by directing water on to a solid block of rinse aid.

14. The method of claim 11 wherein said solid rinse aid is dissolved into a use solution by said contacting the same with water.

15. The method of claim 11 wherein said hard surface comprises metal, glass, plastic, ceramic or tile.

16. A method of making a solid rinse aid composition comprising:

a) combining two or more solid nonionic surfactants, an association disruption agent, wherein said disruption agent is one of: a C12-C16 alcohol alkoxylate with 7 moles of PO and 5 moles of EO, a butoxy capped alcohol ethoxylate, or a fatty alcohol alkoxylate (EO or EO/PO) surfactant, from about 0.1 wt % to about 15 wt. % of a coupler/hydrotrope comprising one or more short chain alkyl benzene and/or alkyl naphthalene sulfonates, a hardening agent and water to form a mixture and b) forming said mixture into a solid, wherein the composition is free of polyoxypropylene-polyoxyethylene reverse block copolymers.

17. The method of claim 16 wherein said forming a solid is by pressing.

18. The method of claim 16 wherein said forming a solid is by extrusion.

19. The method of claim 16 wherein said forming a solid is by casting.

20. The method of claim 16 wherein said mixture is allowed to set for 1 or more days.

* * * * *